US008408584B2

(12) United States Patent
Paxton et al.

(10) Patent No.: US 8,408,584 B2
(45) Date of Patent: *Apr. 2, 2013

(54) PYROTECHNIC TETHER RELEASE ASSEMBLY FOR INFLATABLE AIRBAGS

(75) Inventors: Don Paxton, Romeo, MI (US); Geoffrey Mills, Lake Orion, MI (US); Brent Parks, Englewood, CO (US); Michael P. Jordan, South Weber, UT (US); R. Mark Hubbard, Hooper, UT (US); Marcus Weber, Untertheres (DE)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,346

(22) Filed: Mar. 23, 2011

(65) Prior Publication Data

US 2012/0242068 A1  Sep. 27, 2012

(51) Int. Cl.
*B60R 21/2338* (2011.01)
*B60R 21/20* (2011.01)

(52) U.S. Cl. ............................... 280/728.2; 280/743.2

(58) Field of Classification Search ............ 280/728.2, 280/739, 743.2; 102/530, 531; 89/1.14
See application file for complete search history.

(56) References Cited

U.S. PATENT DOCUMENTS

| | | | |
|---|---|---|---|
| 4,057,026 A | 11/1977 | Nabucet et al. | |
| 4,453,292 A | 6/1984 | Bakker | |
| 5,269,098 A | 12/1993 | Redman | |
| 5,402,728 A * | 4/1995 | Garner | 102/326 |
| 5,458,364 A | 10/1995 | Mueller et al. | |
| 5,718,531 A | 2/1998 | Mutschler, Jr. et al. | |
| 5,771,742 A | 6/1998 | Bokaie et al. | |
| 5,887,894 A | 3/1999 | Castagner et al. | |
| 6,076,854 A | 6/2000 | Schenck et al. | |
| 6,164,689 A | 12/2000 | Rivin et al. | |
| 6,238,438 B1 | 5/2001 | Fischer et al. | |
| 6,299,203 B1 | 10/2001 | Muller | |
| 6,390,501 B1 | 5/2002 | Greib et al. | |
| 6,454,300 B1 | 9/2002 | Dunkle et al. | |
| 6,511,094 B2 | 1/2003 | Thomas et al. | |
| 6,513,835 B2 | 2/2003 | Thomas | |
| 6,561,545 B2 | 5/2003 | Greib et al. | |
| 6,565,114 B1 | 5/2003 | Thomas | |
| 6,581,964 B2 | 6/2003 | Braunschadel | |
| 6,616,184 B2 | 9/2003 | Fischer | |
| 6,634,671 B2 * | 10/2003 | Heigl et al. | 280/743.2 |
| 6,736,426 B2 | 5/2004 | Winters et al. | |

(Continued)

FOREIGN PATENT DOCUMENTS

EP  1866190  12/2010
EP  1866233  4/2012

(Continued)

OTHER PUBLICATIONS

Notice of Allowance and Fee(s) Due issued Sep. 21, 2006 in U.S. Appl. No. 11/087,173, now U.S. Patent No. 7,261,320.

(Continued)

*Primary Examiner* — Joseph Rocca
(74) *Attorney, Agent, or Firm* — Stoel Rives LLP

(57) ABSTRACT

A depth to which an inflatable airbag can deploy may varied by internal tethers. If the tethers are coupled to a release assembly, then in an unreleased state, the tethers can limit the depth of airbag deployment; however, if the tethers are released, the airbag can deploy of a full depth.

19 Claims, 19 Drawing Sheets

U.S. PATENT DOCUMENTS

| | | | |
|---|---|---|---|
| 6,832,778 B2 | 12/2004 | Pinsenschaum et al. | |
| 6,843,157 B2 | 1/2005 | Hamilton et al. | |
| 6,886,338 B2 | 5/2005 | Fischer et al. | |
| 6,918,614 B2 | 7/2005 | Ryan | |
| 6,932,384 B2 | 8/2005 | Waid et al. | |
| 6,932,385 B2 | 8/2005 | Hawthorn et al. | |
| 6,972,659 B2 | 12/2005 | Von Behrens et al. | |
| 6,981,374 B2 | 1/2006 | Von Behrens et al. | |
| 7,017,345 B2 | 3/2006 | Von Behrens et al. | |
| 7,017,945 B2 * | 3/2006 | DePottey et al. | 280/739 |
| 7,021,657 B2 | 4/2006 | Kassman et al. | |
| 7,063,019 B2 | 6/2006 | Parks et al. | |
| 7,063,377 B2 | 6/2006 | Brei et al. | |
| 7,086,297 B2 | 8/2006 | Blakesley et al. | |
| 7,111,871 B2 | 9/2006 | Thomas | |
| 7,144,037 B2 * | 12/2006 | Qvint et al. | 280/739 |
| 7,195,281 B2 | 3/2007 | Williams et al. | |
| 7,240,917 B2 * | 7/2007 | Fogle et al. | 280/739 |
| 7,249,783 B2 | 7/2007 | Parkinson et al. | |
| 7,261,320 B2 | 8/2007 | Fredin et al. | |
| 7,275,763 B2 | 10/2007 | Thomas et al. | |
| 7,374,205 B2 | 5/2008 | Thomas | |
| 7,419,184 B2 | 9/2008 | Green et al. | |
| 7,448,646 B2 | 11/2008 | Hall et al. | |
| 7,510,212 B2 | 3/2009 | Green et al. | |
| 7,607,689 B2 | 10/2009 | Kalczynski et al. | |
| 7,690,683 B2 | 4/2010 | Parks et al. | |
| 7,695,014 B2 * | 4/2010 | Parks et al. | 280/743.2 |
| 7,731,223 B2 | 6/2010 | Lee et al. | |
| 7,784,827 B2 | 8/2010 | Smith et al. | |
| 7,841,623 B2 * | 11/2010 | Ito | 280/743.2 |
| 7,938,444 B2 | 5/2011 | Williams et al. | |
| 7,980,591 B2 * | 7/2011 | Schonhuber et al. | 280/737 |
| 8,235,417 B2 | 8/2012 | Warren et al. | |
| 8,353,525 B2 | 1/2013 | Parks et al. | |
| 2002/0117840 A1 | 8/2002 | Dunkle | |
| 2002/0125705 A1 | 9/2002 | Wong et al. | |
| 2003/0034637 A1 | 2/2003 | Wang et al. | |
| 2003/0172750 A1 | 9/2003 | Blakesley et al. | |
| 2004/0012179 A1 | 1/2004 | Pinsenschaum et al. | |
| 2004/0012180 A1 | 1/2004 | Hawthorn et al. | |
| 2004/0046376 A1 | 3/2004 | Ryan | |
| 2004/0051285 A1 | 3/2004 | Fischer | |
| 2004/0112239 A1 | 6/2004 | Parks et al. | |
| 2004/0164526 A1 | 8/2004 | Hasebe et al. | |
| 2004/0232676 A1 * | 11/2004 | Qvint et al. | 280/739 |
| 2004/0232677 A1 | 11/2004 | Fischer et al. | |
| 2005/0023811 A1 | 2/2005 | Thomas et al. | |
| 2005/0040634 A1 | 2/2005 | Braun et al. | |
| 2005/0057027 A1 | 3/2005 | Fogle et al. | |
| 2005/0057030 A1 | 3/2005 | Fischer et al. | |
| 2005/0104347 A1 | 5/2005 | Hawthorn et al. | |
| 2005/0127648 A1 | 6/2005 | Fischer et al. | |
| 2005/0146122 A1 | 7/2005 | Gould et al. | |
| 2005/0161922 A1 | 7/2005 | Bilbrey et al. | |
| 2005/0212273 A1 | 9/2005 | Thomas et al. | |
| 2005/0225065 A1 | 10/2005 | Fujll | |
| 2005/0248137 A1 | 11/2005 | Delventhal et al. | |
| 2006/0012191 A1 | 1/2006 | Brei et al. | |
| 2006/0071461 A1 | 4/2006 | Williams et al. | |
| 2006/0071462 A1 | 4/2006 | Smith et al. | |
| 2006/0151975 A1 | 7/2006 | Yamaji et al. | |
| 2006/0170202 A1 | 8/2006 | Block et al. | |
| 2006/0186655 A1 | 8/2006 | Ehrke | |
| 2006/0192370 A1 | 8/2006 | Abe et al. | |
| 2006/0214398 A1 | 9/2006 | Fredin et al. | |
| 2006/0214406 A1 | 9/2006 | Parkinson et al. | |
| 2006/0284404 A1 | 12/2006 | Green et al. | |
| 2006/0290117 A1 | 12/2006 | Fischer et al. | |
| 2007/0029762 A1 | 2/2007 | Katsuda et al. | |
| 2007/0040366 A1 | 2/2007 | Maidel et al. | |
| 2007/0108750 A1 | 5/2007 | Bauer et al. | |
| 2007/0170709 A1 | 7/2007 | Braun et al. | |
| 2007/0194561 A1 | 8/2007 | Thomas | |
| 2007/0205590 A1 | 9/2007 | Klinkenberger et al. | |
| 2007/0205591 A1 | 9/2007 | Bito | |
| 2007/0216146 A1 | 9/2007 | Williams et al. | |
| 2007/0252370 A1 | 11/2007 | Thomas | |
| 2008/0023950 A1 | 1/2008 | Kalczynski et al. | |
| 2008/0036188 A1 | 2/2008 | Gould et al. | |
| 2008/0203716 A1 | 8/2008 | Parks et al. | |
| 2008/0238050 A1 | 10/2008 | Green et al. | |
| 2008/0238062 A1 | 10/2008 | Parks et al. | |
| 2009/0039630 A1 | 2/2009 | Schneider et al. | |
| 2009/0230663 A1 | 9/2009 | Mills et al. | |
| 2009/0267326 A1 * | 10/2009 | Ito | 280/728.1 |
| 2009/0302588 A1 | 12/2009 | Schramm | |
| 2009/0309342 A1 * | 12/2009 | Schonhuber et al. | 280/737 |
| 2010/0078924 A1 | 4/2010 | Mitsuo et al. | |
| 2010/0090445 A1 | 4/2010 | Williams et al. | |
| 2010/0090450 A1 | 4/2010 | Webber | |
| 2012/0242069 A1 | 9/2012 | Parks et al. | |
| 2012/0242070 A1 | 9/2012 | Paxton et al. | |

FOREIGN PATENT DOCUMENTS

| | | |
|---|---|---|
| JP | 2002507518 | 3/2002 |
| JP | 2002-362301 | 12/2002 |
| JP | 2004-521801 | 7/2004 |
| JP | 2004-262427 | 9/2004 |
| JP | 2005-053329 | 3/2005 |
| JP | 2008534354 | 8/2008 |
| JP | 2008543656 | 12/2008 |
| WO | WO-96/31370 | 10/1996 |
| WO | WO-99/48728 | 9/1999 |
| WO | WO-02/068249 | 9/2002 |
| WO | WO-03/006276 | 1/2003 |
| WO | WO-2004/007975 | 1/2004 |
| WO | WO-2005/087549 | 9/2005 |
| WO | WO 2006/101588 | 9/2006 |
| WO | WO 2006/102432 | 9/2006 |
| WO | WO 2006/137989 | 12/2006 |
| WO | WO 2008/118526 | 10/2008 |
| WO | WO 2010/045040 | 4/2010 |
| WO | WO-2012/129467 | 9/2012 |

OTHER PUBLICATIONS

Office Action issued Oct. 3, 2006 in U.S. Appl. No. 11/087,476, now U.S. Patent No. 7,249,783.

Interview Summary issued Nov. 8, 2006 in U.S. Appl. No. 11/087,476, now U.S. Patent No. 7,249,783.

Amendment and Response filed Dec. 13, 2006 in U.S. Appl. No. 11/087,476, now U.S. Patent No. 7,249,783.

Notice of Allowance and Fee(s) Due issued Mar. 22, 2007 in U.S. Appl. No. 11/087,476, now U.S. Patent No. 7,249,783.

Restriction Requirement issued Aug. 13, 2007 in U.S. Appl. No. 11/154,126, now U.S. Patent No. 7,419,184.

Response to Restriction Requirement filed Nov. 8, 2007 in U.S. Appl. No. 11/154,126, now U.S. Patent No. 7,419,184.

Office Action issued Dec. 10, 2007 in U.S. Appl. No. 11/154,126, now U.S. Patent No. 7,419,184.

Amendment and Response filed Mar. 10, 2008 in U.S. Appl. No. 11/154,126, now U.S. Patent No. 7,419,184.

Notice of Allowance and Fee(s) Due issued Jun. 25, 2008 in U.S. Appl. No. 11/154,126, now U.S. Patent No. 7,419,184.

Office Action issued Feb. 23, 2009 in U.S. Appl. No. 11/728,688, now U.S. Patent No. 7,690,683.

Amendment and Response to Office Action filed Aug. 24, 2009 in U.S. Appl. No. 11/728,688, now U.S. Patent No. 7,690,683.

Notice of Allowance and Fee(s) Due issued Dec. 15, 2009 in U.S. Appl. No. 11/728,688, now U.S. Patent No. 7,690,683.

Office Action issued Jan. 8, 2008 in U.S. Appl. No. 11/728,815, now U.S. Patent No. 7,510,212.

Amendment and Response to Office Action filed May 8, 2008 in U.S. Appl. No. 11/728,815, now U.S. Patent No. 7,510,212.

Office Action issued Aug. 19, 2008 in U.S. Appl. No. 11/728,815, now U.S. Patent No. 7,510,212.

Amendment and Response to Office Action field Nov. 4, 2008 in U.S. Appl. No. 11/728,815, now U.S. Patent No. 7,510,212.

Notice of Allowance and Fee(s) Due issued Dec. 15, 2008 in U.S. Appl. No. 11/728,815, now U.S. Patent No. 7,510,212.

Office Action issued Apr. 5, 2010 in U.S. Appl. No. 12/134,021, now published as US-2009/0302588.

Office Action issued Jul. 23, 2010 in U.S. Appl. No. 12/251,262, now published as US-2010/0090445.
Amendment and Response to Office Action filed Jan. 24, 2011 in U.S. Appl. No. 12/251,262, now published as US-2010/0090445.
Notice of Allowance and Fee(s) Due mailed Mar. 18, 2011 in U.S. Appl. No. 12/251,262, now published as US-2010/0090445.
Notification of Transmittal of the International Search Report and the Written Opinion of the International Searching Authority issued Oct. 20, 2006 in International Application No. PCT/US2006/002690.
Notification of Transmittal of the International Search Report and the Written Opinion of the International Searching Authority issued Jan. 9, 2007 in International Application No. PCT/US2006/010441.
Notification of Transmittal of the International Search Report and the Written Opinion of the International Searching Authority issued Sep. 25, 2007 in International Application No. PCT/US2006/017126.
Notification of Transmittal of the International Search Report and the Written Opinion of the International Searching Authority issued Jul. 31, 2008 in International Application No. PCT/US2008/052266.
Notification of Transmittal of the International Search Report and the Written Opinion of the International Searching Authority issued Dec. 4, 2009 in International Application No. PCT/US2009/059379.
Supplementary European Search Report issued May 25, 2009 in European Patent Application No. 06719524.8.
Supplementary European Search Report issued May 12, 2009 in European Patent Application No. 06748559.9.
Co-pending U.S. Appl. No. 13/070,368, filed Mar. 23, 2011, titled Pyrotechnic Tether Release Assembly With a Break-Away Piston for Inflatable Airbags.
Supplementary European Search Report issued Oct. 20, 2011 in European Patent Application No. 06752207.8.
Co-pending U.S. Appl. No. 13/427,605, filed Mar. 22, 2012, titled Pyrotechnic Tether Release Assembly for Inflatable Airbags.
Notice of Allowance and Fee(s) Due mailed Sep. 21, 2012 in co-pending U.S. Appl. No. 13/070,368, now published as US Patent Application Publication No. US 2012/0242069.
Notice to File Corrected Application Parts mailed Nov. 1, 2012 in co-pending U.S. Appl. No. 13/070,368, now published as US Patent Application Publication No. US 2012/0242069.
Response to Rule 312 Communication mailed Dec. 7, 2012 in co-pending U.S. Appl. No. 13/070,368, now published as US Patent Application Publication No. US 2012/0242069.
Preliminary Amendment filed Nov. 29, 2012 in co-pending U.S. Appl. No. 13/427,605, now published as US Patent Application Publication No. US 2012/0242070.
Terminal Disclaimer filed Dec. 5, 2012 in co-pending U.S. Appl. No. 13/427,605, now published as US Patent Application Publication No. US 2012/0242070.
Second Preliminary Amendment filed Dec. 6, 2012 in co-pending U.S. Appl. No. 13/427,605, now published as US Patent Application Publication No. US 2012/0242070.
Notice of Allowance and Fee(s) Due mailed Dec. 13, 2012 in co-pending U.S. Appl. No. 13/427,605, now published as US Patent Application Publication No. US 2012/0242070.
Preliminary Amendment filed Apr. 30, 2012 in co-pending U.S. Appl. No. 13/070,368.
Notification of Transmittal of the International Search Report and the Written Opinion of the International Searching Authority mailed Jun. 29, 2012 in International Application No. PCT/US2012/030252.

* cited by examiner

PYROTECHNIC TETHER RELEASE ASSEMBLY FOR INFLATABLE AIRBAGS

TECHNICAL FIELD

The present disclosure relates generally to the field of automotive safety systems. More specifically, the present disclosure relates to inflatable airbag cushion assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes confirmations from the rolled/folded configuration to an expanded configuration. A deployed configuration of an airbag may be partially determined by one or more internal or external tethers. The tethers may limit or restrict the width, depth, and/or height of the airbag. Further, the tethers may be configured to be releasable such that the airbag may adopt more than one deployed configuration.

Figure 1:
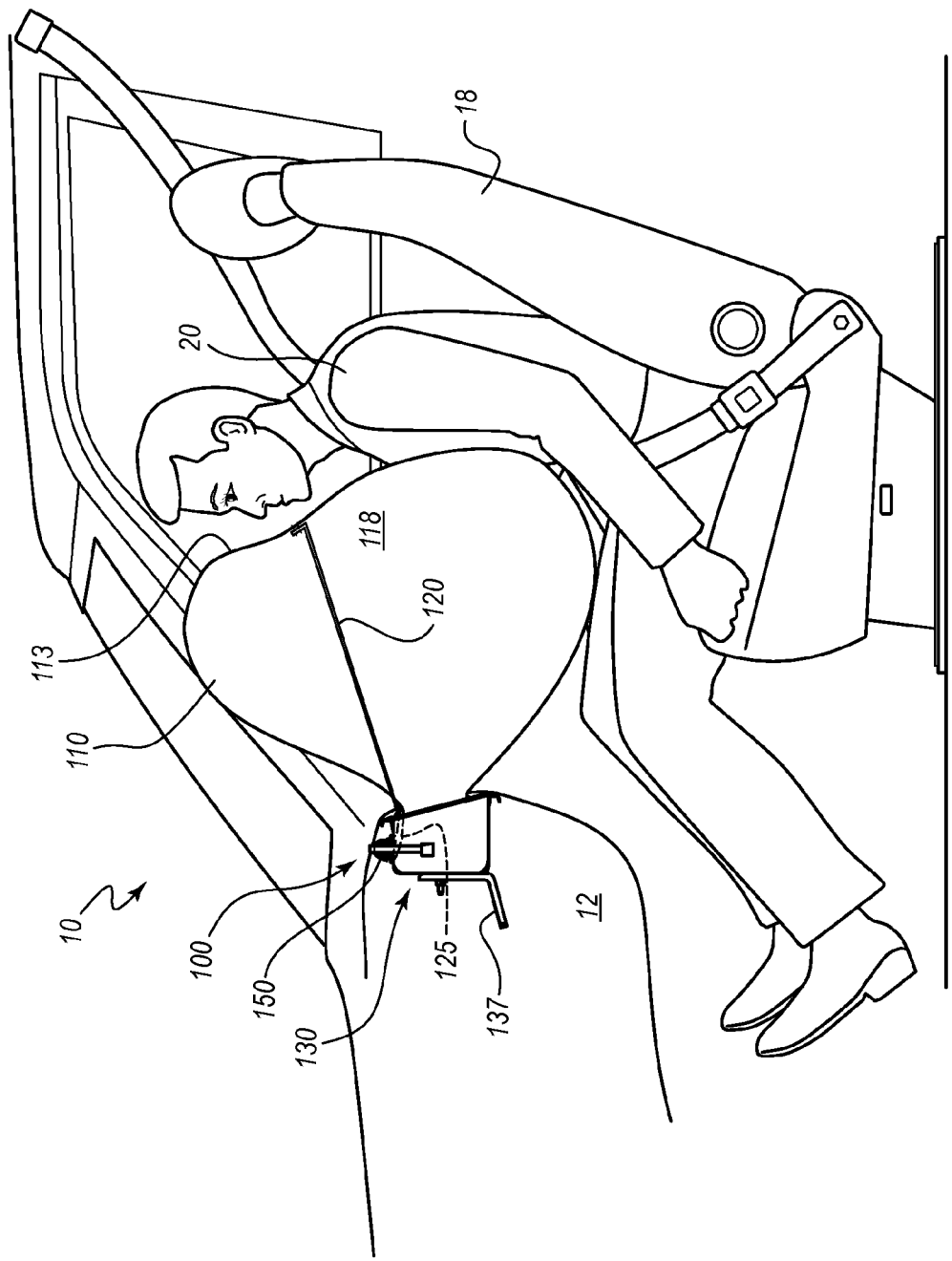
FIG. 1 is a perspective view of an interior of a vehicle with a passenger, wherein an airbag assembly has been deployed to a first configuration.
Figure 2:
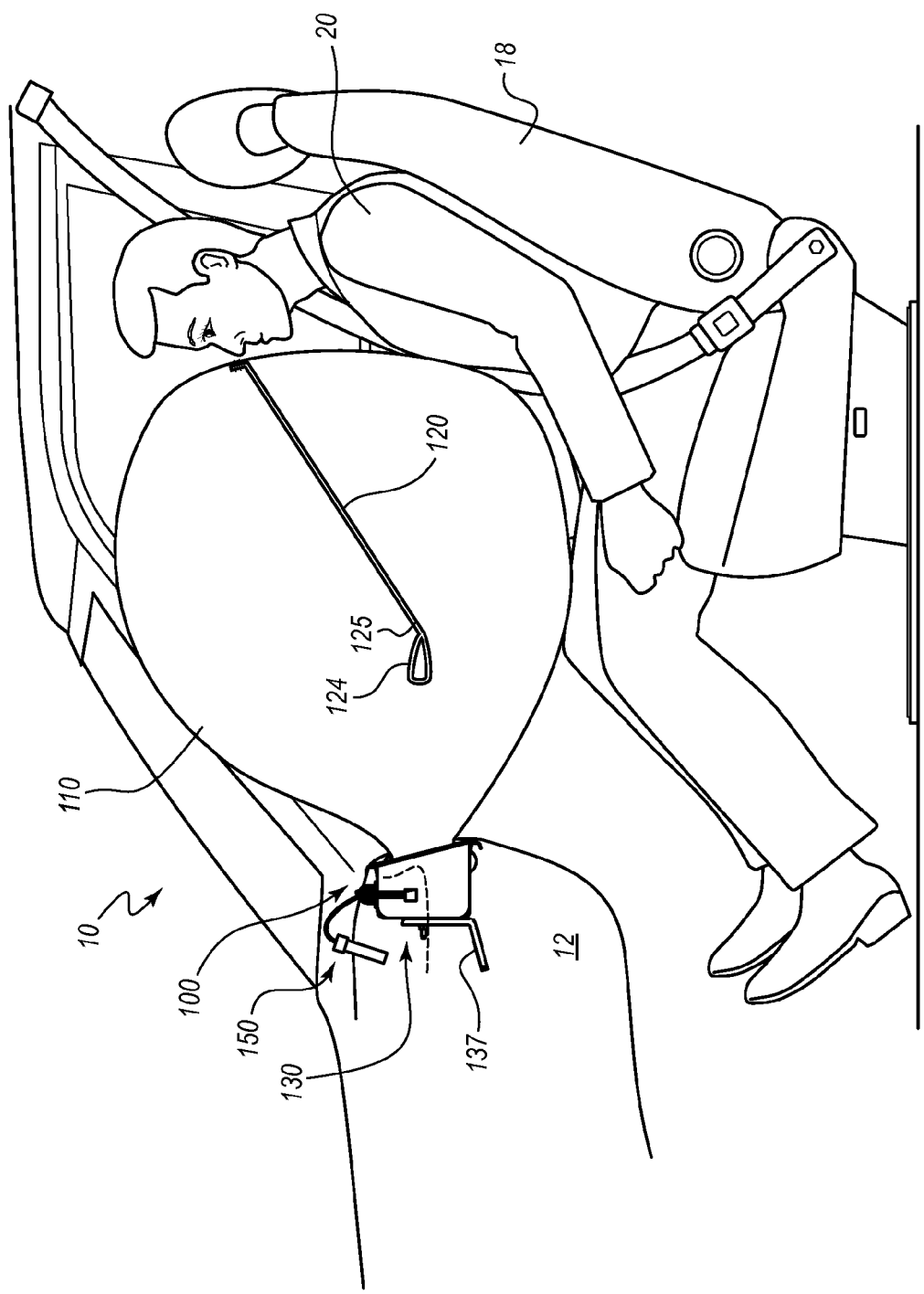
FIG. 2 is a perspective view of an interior of a vehicle with a passenger, wherein the airbag assembly of FIG. 1 has been deployed to a second configuration.

FIGS. 1-2 depict perspective views of an interior of a vehicle 10, in which an occupant 20 is seated on a seat 18. Inflatable airbag assembly 100 is depicted in a deployed configuration. Airbag assembly 100 may comprise an inflatable airbag 110, tethers 120, a housing 130, and a release assembly 150. Airbag assembly 100 is depicted as being mounted in an instrument panel 12, via a mounting bracket 137.

In the depiction of FIG. 1, airbag 100 is in an inflated state and extends from housing 130 to a predetermined depth in a car-rearward direction. Tethers 120 may be located within an inflatable void 118 of airbag 110 such that a front face 113 of the airbag may be deployed to a predetermined depth. Tethers 120 comprise a connecting portion 125, which connects tethers 120 to release assembly 150.

Release assembly may either retain connecting portion 125 or release the connecting portion such that inflatable airbag 100 may adopt either a constrained configuration or an unconstrained, fully deployed configuration, as depicted in FIG. 2. Before or during inflatable airbag deployment, one or more vehicle sensors may electronically signal release assembly 150 to release tethers 120 and thereby allow airbag 110 to deploy without constraint imposed by the tethers. In the depicted embodiment, connecting portion 125 of tethers 120 comprises a loop 124 that may be retained or released by release assembly 150.

As will be appreciated by those skilled in the art, one or more vehicle sensors of a variety of types and configurations can be utilized to configure a set of predetermined conditions that will dictate whether the release device releases the vent straps. For example, in one embodiment, a seat rail sensor is utilized to detect how close or far away from an airbag deployment surface an occupant's seat is positioned. In another embodiment, a seat scale may be used to determine whether an occupant is occupying the seat and if so, ascertain an approximate weight of the occupant. In yet another embodiment an optical or infrared sensor may be used to determine an occupant's approximate surface area and/or distance from an airbag deployment surface. In another embodiment, an accelerometer is employed to measure the magnitude of negative acceleration experienced by a vehicle, which may indicate whether an accident has occurred and the severity of the accident. Additionally, a combination of these and other suitable sensor types may be used.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable cushion; a rear passenger side airbag; a driver's airbag; and/or a front passenger airbag. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

One skilled in the art will also appreciate that the retention of inflation gas within the cushion can be modulated by the presence of one or more fixed or discrete vents, which are configured to allow for inflation gas to exit the interior of the cushion. Further, in order for a fully inflated shape of an airbag cushion membrane to adopt a predetermined shape, internal and external tethers may be used, wherein the tethers limit the expansion of the airbag and restrict it to the predetermined shape. Tethers are typically coupled to one or more surfaces of a cushion membrane and extend to another surface of the cushion, the airbag housing, or a vehicle structure.

Figure 3:
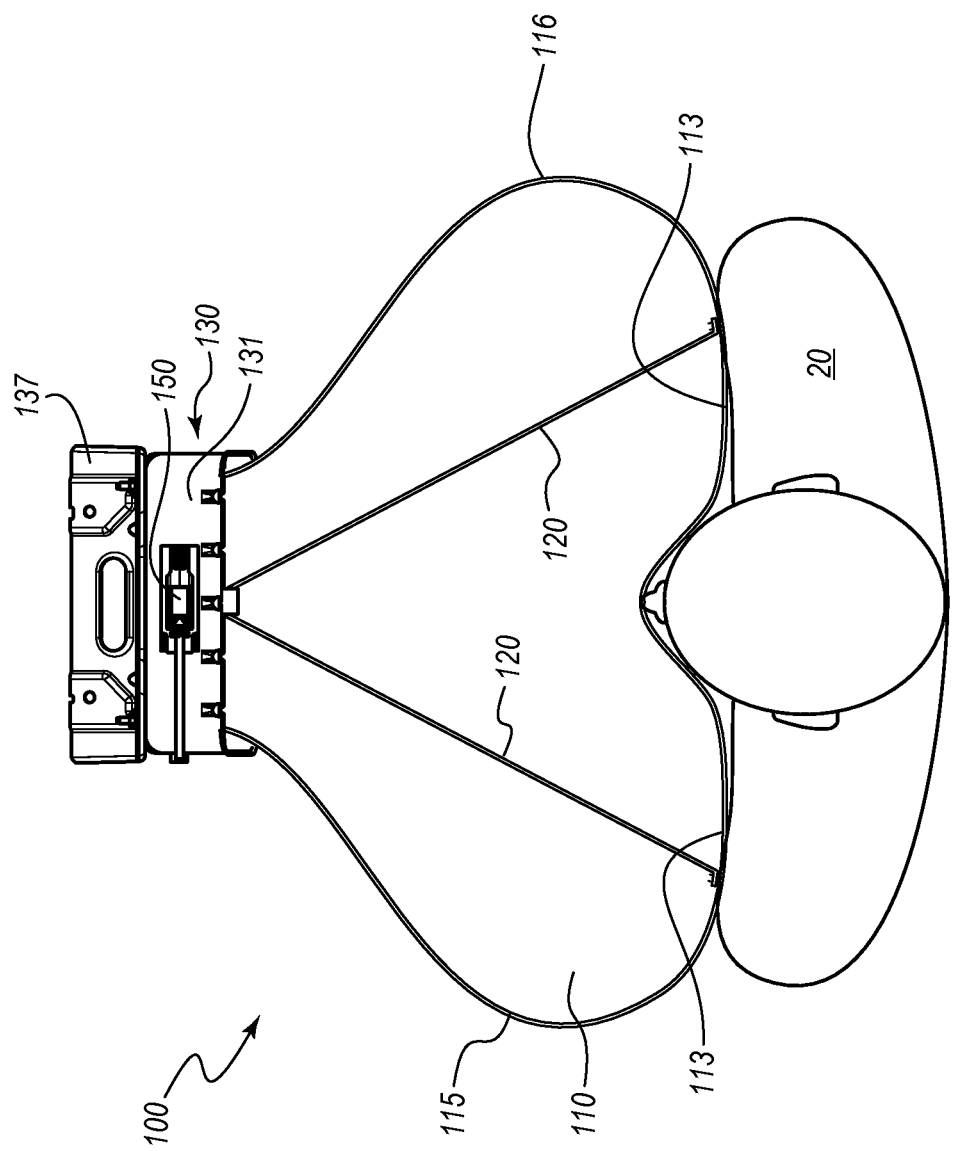
FIG. 3 is a top view of the airbag assembly of FIG. 1, wherein the airbag is deployed to the first configuration.
Figure 4:
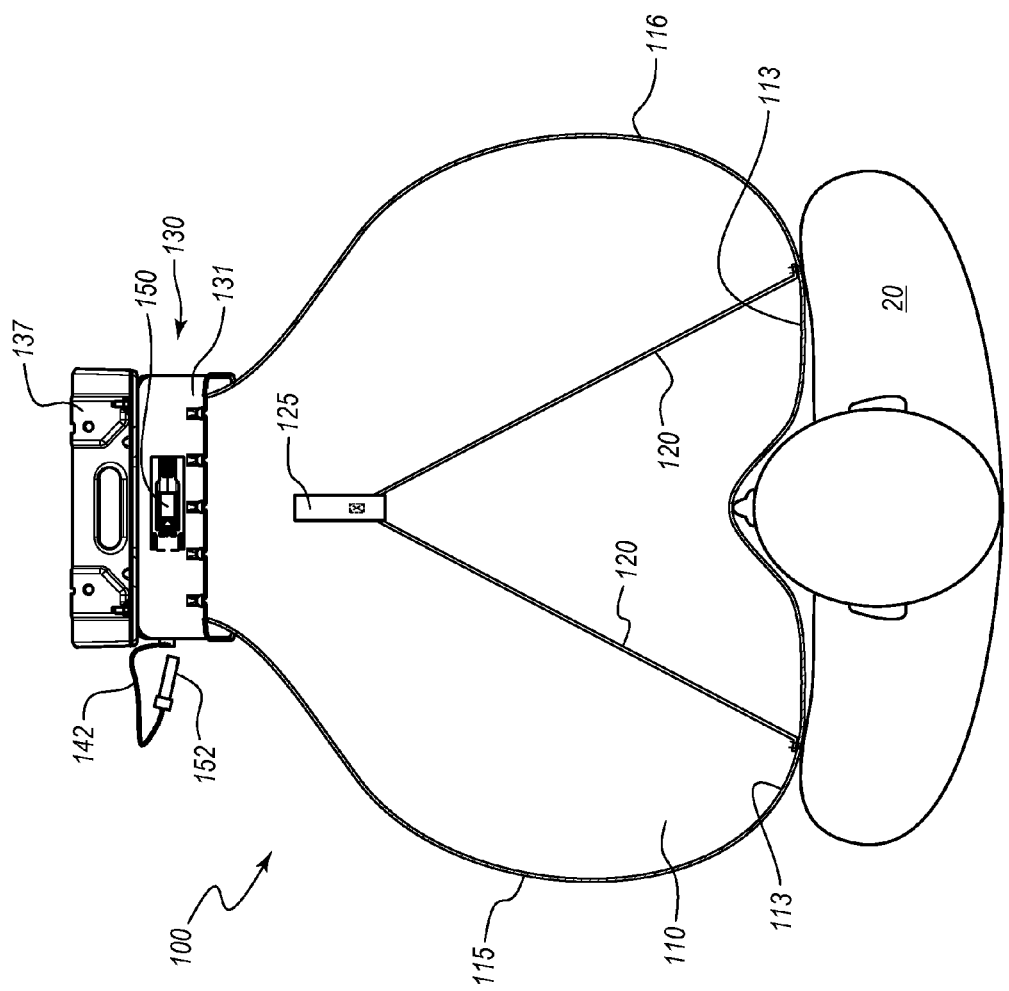
FIG. 4 is a top elevation view of the airbag assembly of FIG. 3, wherein the airbag assembly is deployed to a second configuration.

FIGS. 3-4 are top views of airbag assembly 100 and occupant 20. Inflatable airbag 110 may comprise front face 113, a first side face 115, and a second side face 116. The various faces of cushion membrane 110 define an interior inflatable void, within which tethers 120 may be located. Mounting bracket 137 extends from housing 130, and release assembly 150 may be located on a first longitudinal sidewall 131 of housing 130. Tethers 120 may comprise horizontal tethers and/or vertically oriented tethers. The vertically oriented tethers may be coupled to a bottom portion of an airbag and may extend to a front face and/or a top portion of the airbag. In the depiction of FIG. 3, airbag 110 is in an inflated configuration, wherein the airbag has been deployed to a first configuration, which may also be called a constrained configuration. In the constrained configuration, release assembly 150 does not release tethers 120. A car-rearward depth of airbag 110 is restrained by tethers 120. In the constrained configuration, tethers 120 may also constrain a width and a height to which airbag 110 may deploy. In other words, the tethers may limit one or more inflated dimension of the airbag.

In the depiction of FIG. 4, tether release assembly 150 has released connecting portion 125 such that front face 113 of airbag 110 may extend a greater distance away from housing 130 when compared to the constrained configuration depicted in FIG. 3. Additionally, airbag 110 may comprise a greater width and a greater height in the unconstrained configuration when compared to the constrained configuration. In the unconstrained configuration of airbag assembly 100, depicted in the embodiment of FIG. 4, release assembly 150 comprises wires 142 and a cylindrical body portion 152, wherein the body portion has slid out of a mounting member for the release assembly such that connecting portion 125 of tethers 120 became uncoupled from the release assembly.

Figure 5:
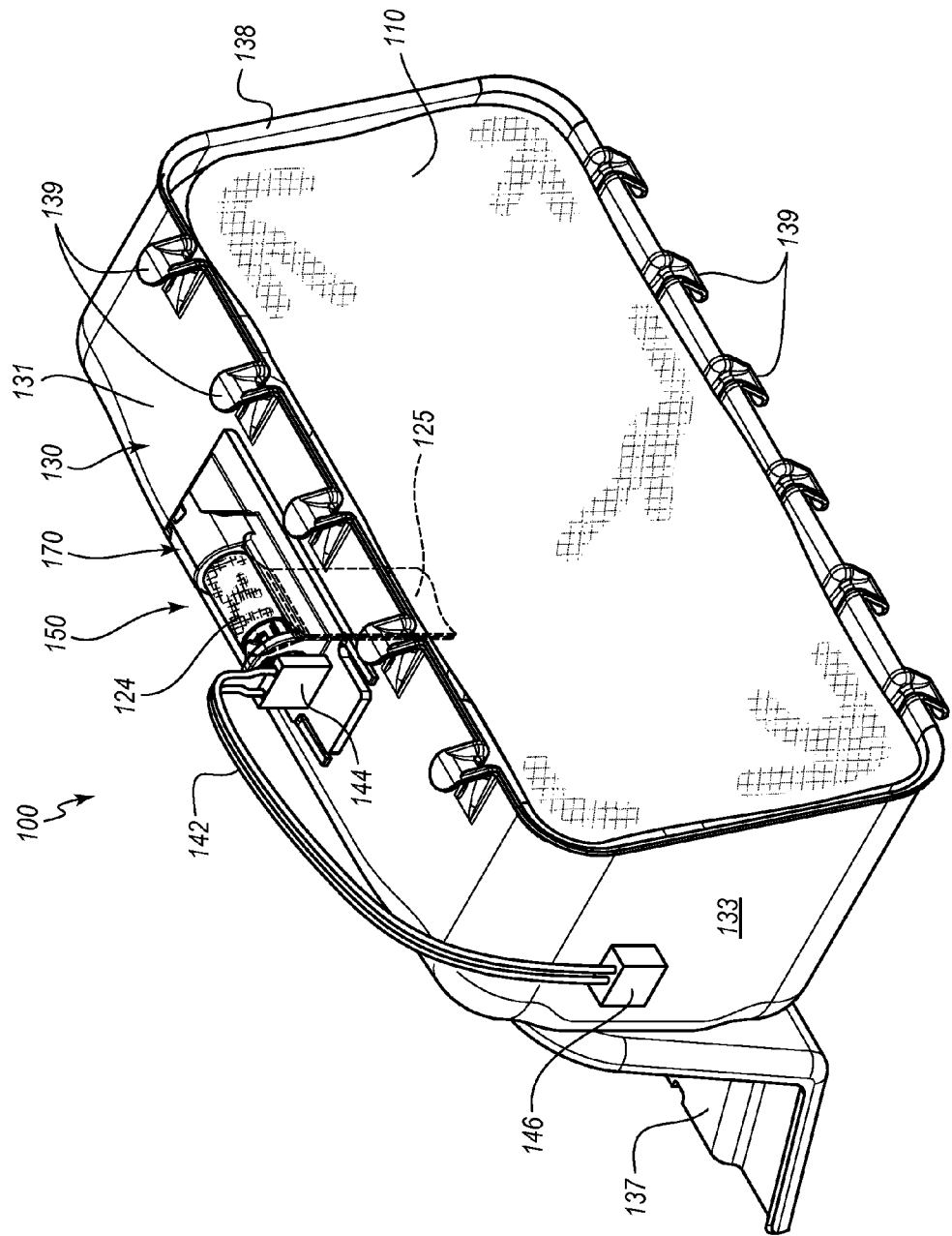
FIG. 5 is a perspective view of a portion of the airbag assembly of FIG. 1.
Figure 6:
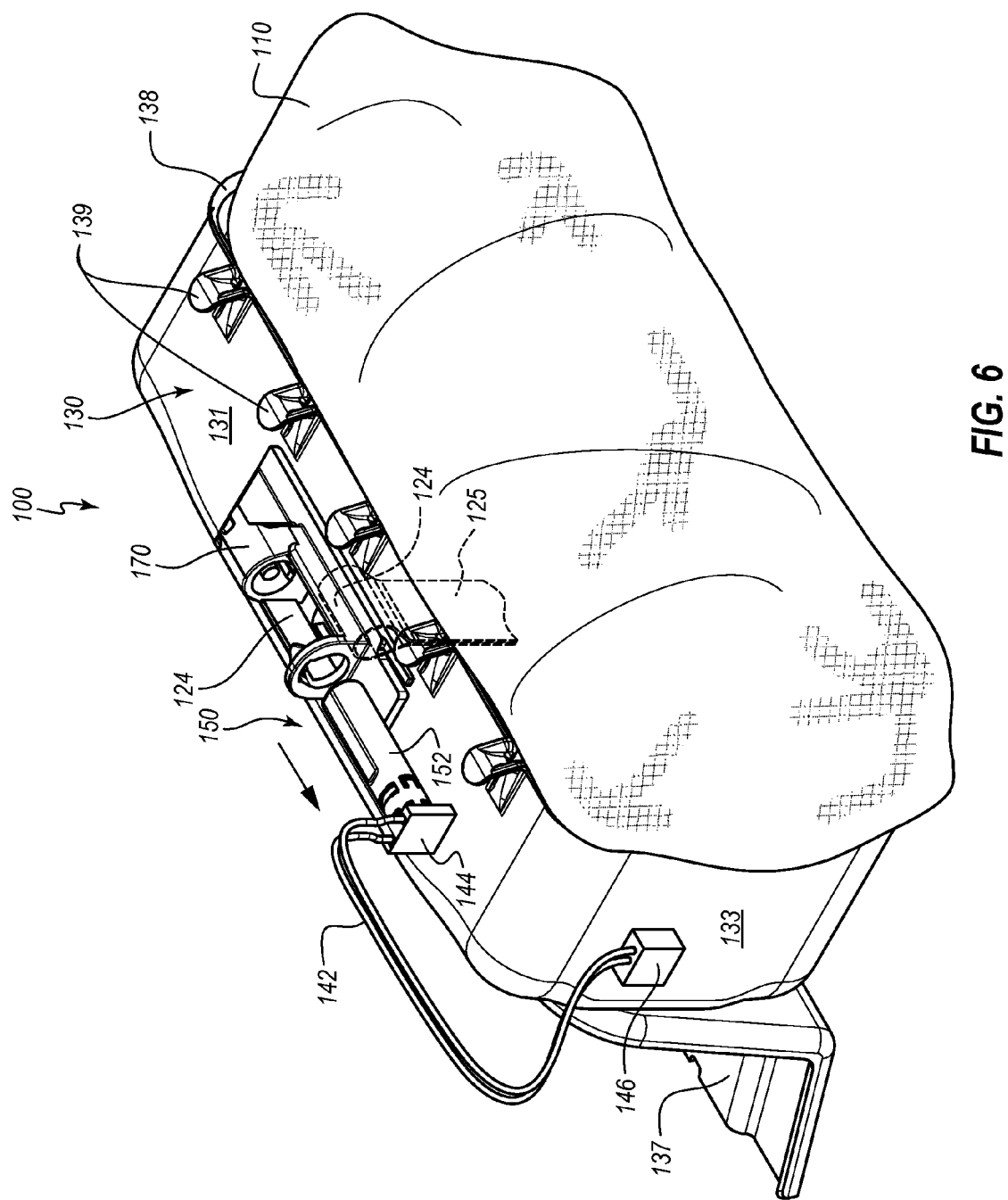
FIG. 6 is a perspective view of the airbag assembly of FIG. 5 at a time that is later in an airbag deployment sequence.

FIGS. 5-6 are perspective views of the airbag assembly of FIG. 1. Assembly 100 may comprise airbag 110, housing 130, release assembly 150, and a mounting member 170 for the release assembly. Airbag 110 is depicted as being in a folded and/or rolled configuration, which may also be called a packaged configuration. The airbag tethers extend toward a car-forward wall of housing 130, such that loop 124 of connecting portion 125 of the tethers may interact with the release assembly 150.

Airbag housing 130 may comprise a first-longitudinal sidewall 131 that is opposite a second longitudinal sidewall (not visible). Housing 130 may also comprise opposing lateral sidewalls 133, mounting bracket 137, which may be coupled to a car-forward wall, a rim 138, and cover coupling structures 139, which are configured as hooks. A cover is configured to be mounted over airbag 110 via hooks 139. The cover may comprise fabric or a plastic cosmetic cover.

Release assembly 150 is depicted as being coupled to first longitudinal sidewall 131 of housing 130 via mounting member 170. Release assembly 150 may comprise a plurality of wires 142, a vehicle sensor connector 146, and an activator connector 144. In the depiction of FIG. 5, release assembly 150 has not yet been activated. In the depiction of FIG. 6, the release assembly has been activated and has released loop 124 of connecting portion 125 of the airbag tethers. Inflation gas entering airbag 110 has begun to inflate the airbag, which may pull connecting portion 125 of the tethers away from release assembly 150, mounting member 170, and longitudinal sidewall 131 of housing 130.

Housing 130 may comprise a metal container that is fixedly attached to airbag 110 via a throat portion of the cushion. Housing 130 is configured to be mounted within a vehicle and serves to specifically position airbag assembly 100 so that the airbag may deploy with predetermined characteristics. Housing 130 is configured to allow for fluid communication between the inflatable void of cushion 110 and an inflator (not shown). The inflator is configured to be activated in response to predetermined vehicle conditions, as determined by vehicle sensors. Upon activation, the inflator rapidly generates or releases inflation gas, which forces the airbag cushion through the cosmetic cover and rapidly inflates the cushion. The inflator may be one of several types, such as pyrotechnic, stored gas, or a combination inflator. Additionally, the inflator may comprise a single or multistage inflator.

As will be appreciated by those skilled in the art, a variety of types and configurations of airbag housings can be utilized without departing from the scope and spirit of the present disclosure. For example, in one embodiment, the housing comprises fabric that may or may not further comprise a mounting bracket. Also, the housing may have an integrated inflator, or the housing may be used to mount the inflator with the vehicle. Alternatively, the housing may not connect to the inflator and a path of inflation gas travel may not flow through the housing.

Figure 7A:
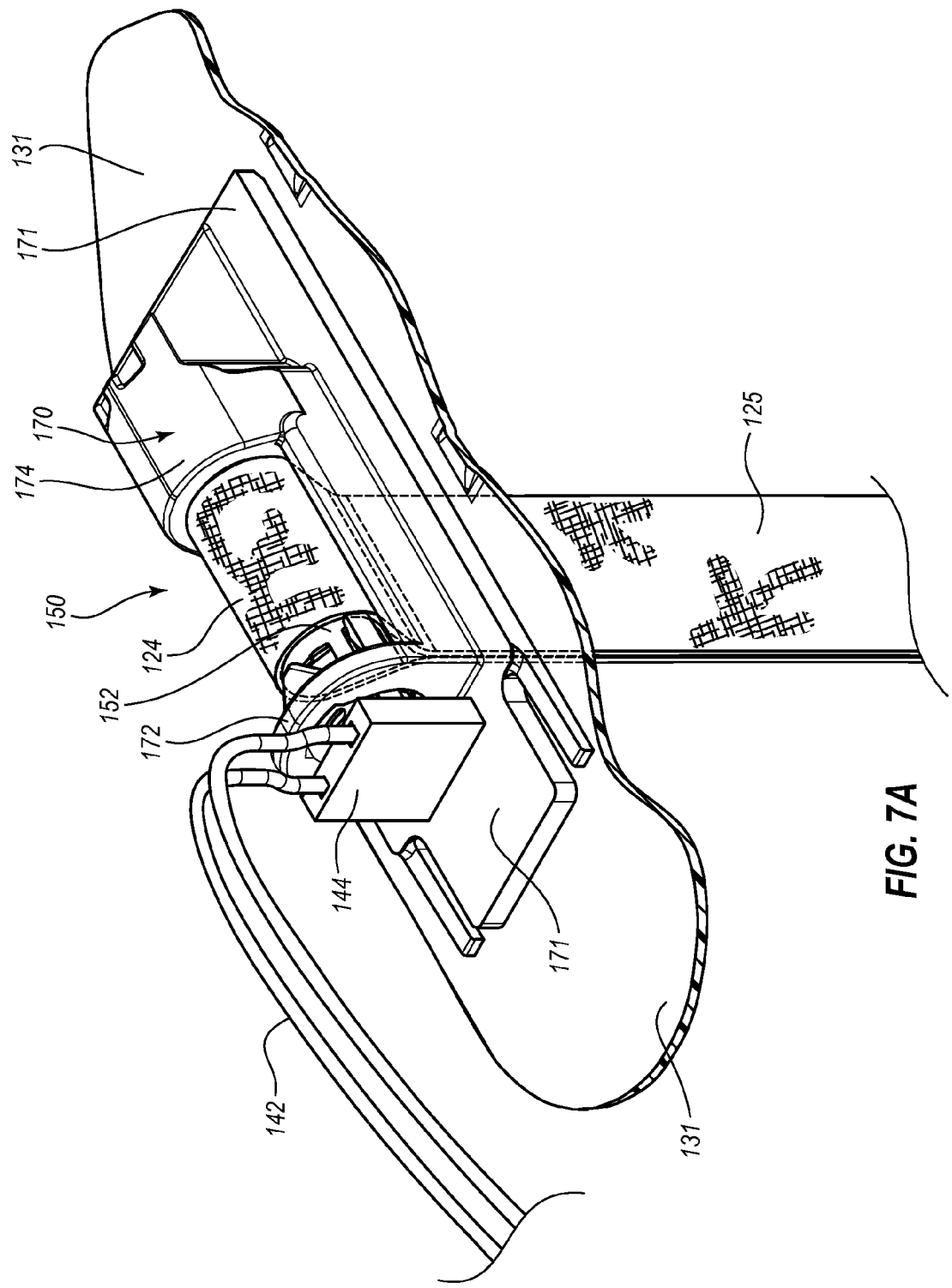
FIG. 7A cutaway perspective view of a portion of the airbag assembly of FIG. 5.
Figure 7B:
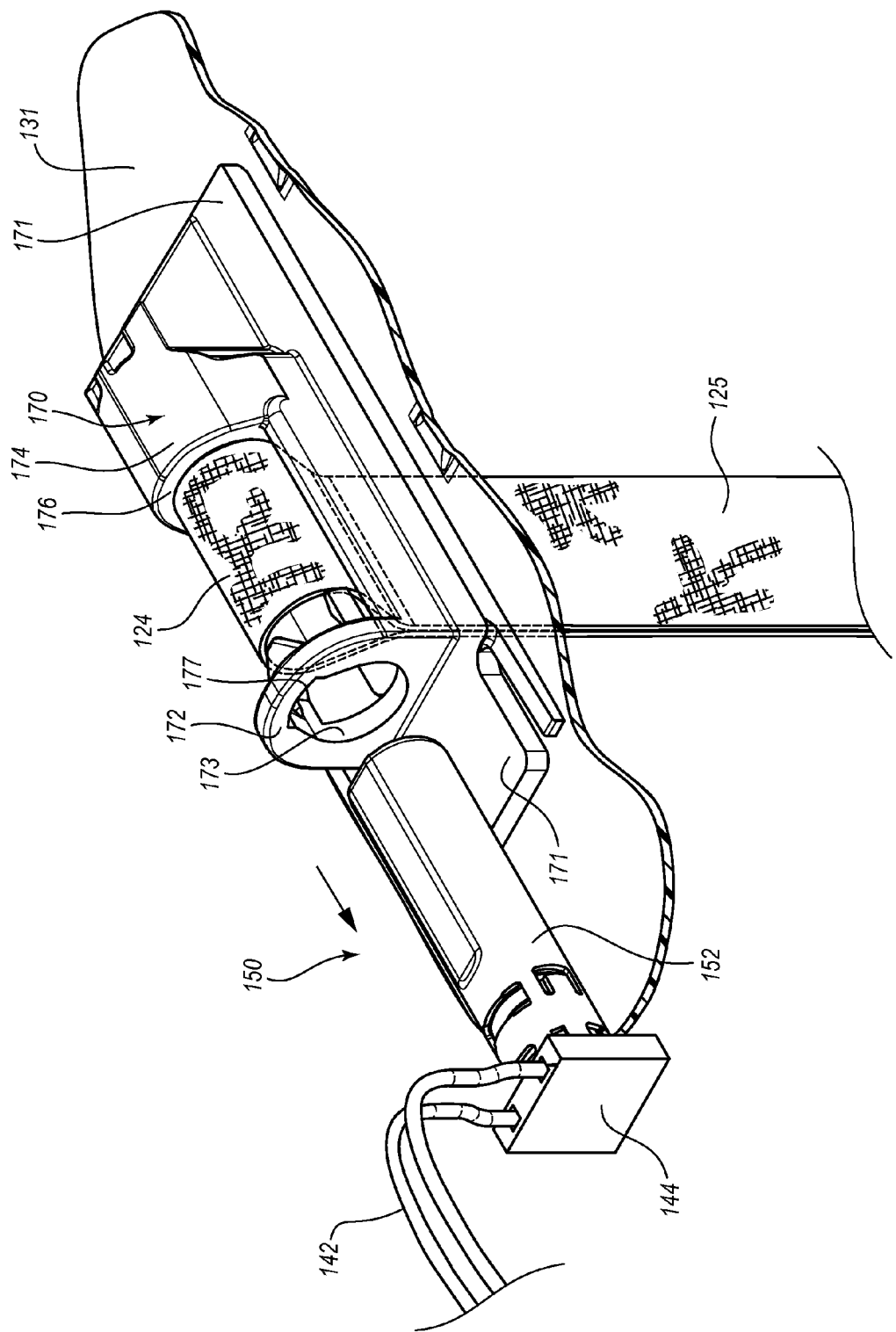
FIG. 7B is a perspective view of the airbag assembly of FIG. 7A at a time that is later in a deployment sequence.
Figure 7C:
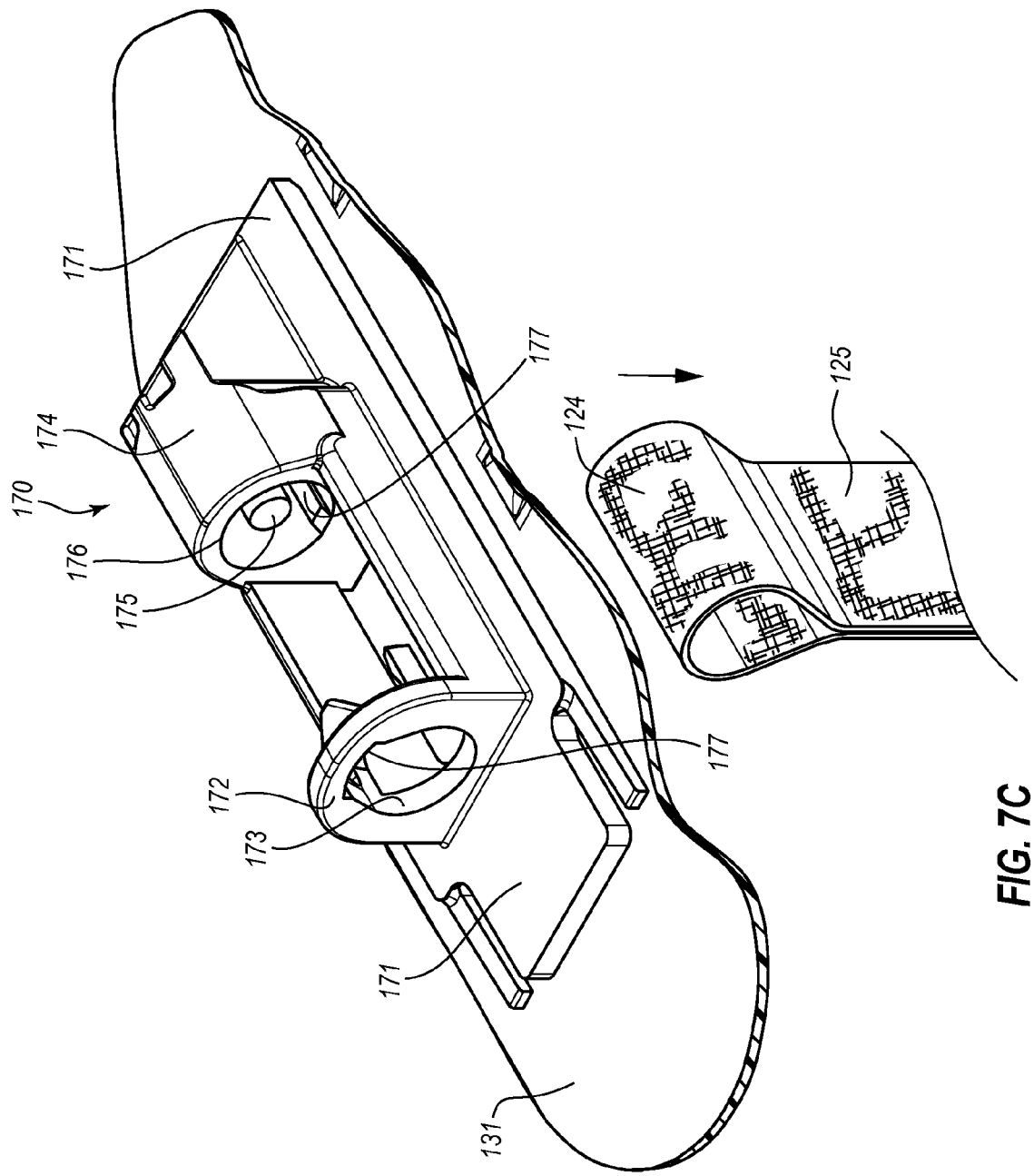
FIG. 7C is a perspective view of the airbag assembly of FIG. 7B at a time that is later in a deployment sequence.

FIGS. 7A-7C depict close-up cutaway perspective views of portions of some of the components of the airbag assembly depicted above. As described herein, release assembly 150 is coupled to first longitudinal sidewall 131 of the airbag housing via mounting member 170. Release assembly 150 may comprise wires 142, body portion 152, and activator connector 144. Mounting member 170 may comprise a base region 171, an open end 172, a closed end 174, and orienting structures 177.

In the depiction of FIG. 7A, connecting portion 125 of the airbag tethers has been captured at loop 124 by the body potion 152 of release assembly 150. If vehicle sensors do not activate release assembly 150, upon deployment, the airbag will be in the constrained configuration, in which its height, width, and/or depth may be restricted by the airbag tethers.

In the depiction of FIG. 7B, release assembly 150 has received one or more signals from one or more vehicle sensors via wires 142, such that the release assembly has become activated. Once the release assembly has been activated, wires 142 may function as release assembly tethers, such that the release assembly may not travel beyond a predetermined distance. In other words, the wire or wires may act as a stop for the tether release assembly. Activator connector 144 may relay the signal to a pyrotechnic squib, which causes the release assembly to be activated. Upon activation, body portion 152 of release assembly 150 may slide out of mounting member 170 via a first aperture 173, such that loop 124 of connecting portion 125 of the tethers is released.

FIG. 7C depicts the portions of the airbag assembly of FIG. 7B at a time that is later in a deployment sequence. In the depiction of FIG. 7C, the release assembly has traveled out of the frame of the figure. Tether connecting portion 125 is no longer coupled to the release assembly such that it may be pulled away from mounting member 170 and first longitudinal sidewall 131 of the airbag housing. As such, the airbag can adopt an unconstrained configuration.

FIGS. 8A-8D depict cross-sectional views of portions of the airbag assembly of FIG. 1. Visible in these figures are portions of airbag tethers 120, airbag housing 130, release assembly 150, and mounting member 170. Tethers 120 comprise connecting portion 125 and loop 124. Housing 130 comprises first longitudinal sidewall 131.

Mounting member 170 is configured to receive and reversibly retain cylindrical body portion 152 of tether release assembly 150, and may comprise base region 171, open end 172, first aperture 173, closed end 174, a post 175, a second aperture 176, and coupling structures 178. Mounting member 170 may partially comprise a cylindrical shape, which corresponds to the shape of the tether release assembly. Coupling structures 178 may extend from base plate 171 and may at least partially extend through a sidewall of housing 130. The mounting member may also comprise orienting structures, which are configured to engage complementary orienting structures on portions of the tether release assembly, such as the body portion. Additionally, the orienting structures may comprise retaining structures, such as a bracket or a tab that frictionally engage the release assembly in a retained state within the mounting member, until the pyrotechnic squib is activated.

Figure 8A:
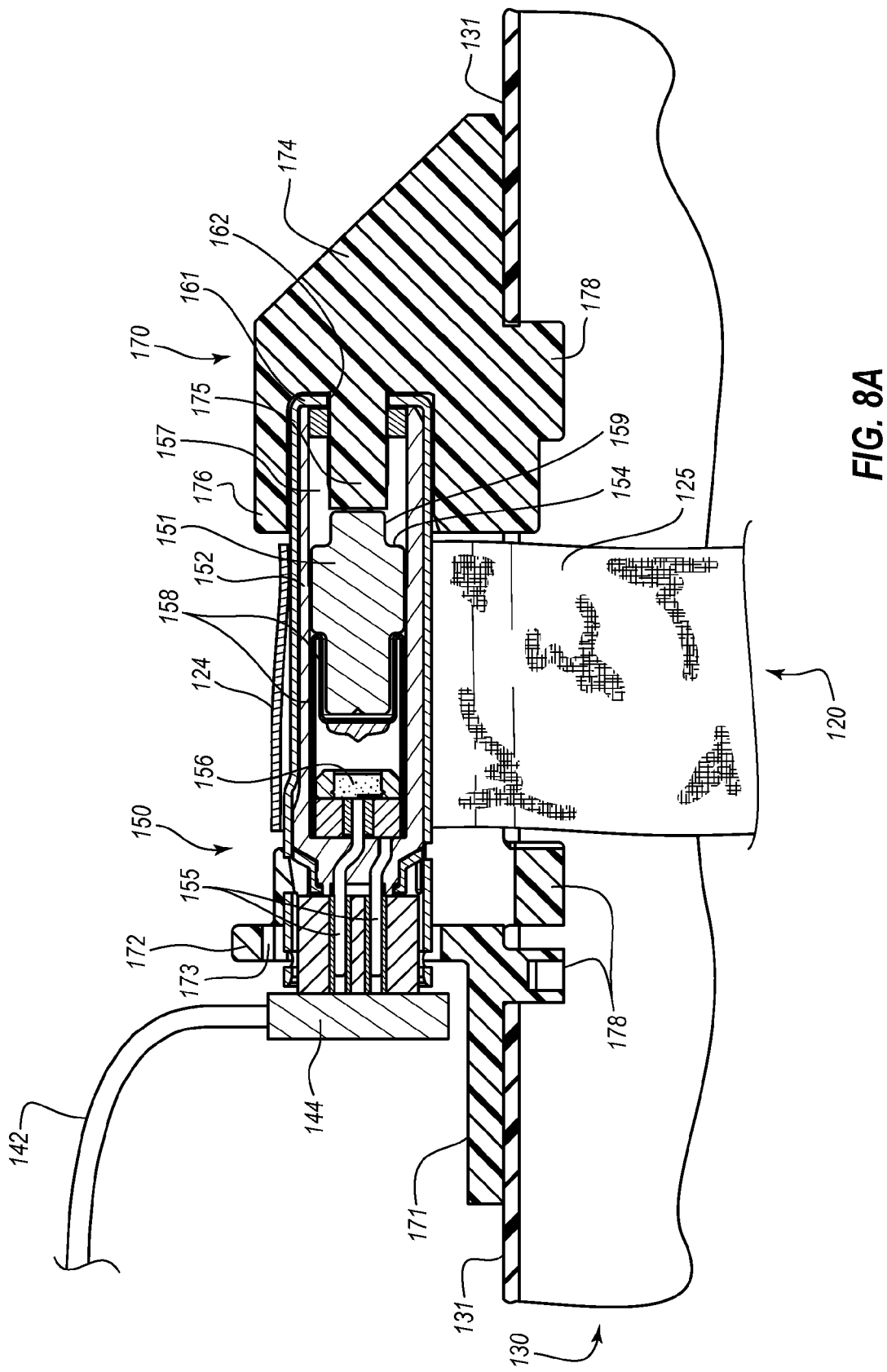
FIG. 8A is a cross-sectional view of a portion of the airbag assembly of FIG. 1.

Release assembly 150 may comprise wires 142, an activator connector 144, a piston 151, a body portion 152, squib wires 155, a pyrotechnic squib 156, a chamber 157, a membrane 158, a distal region 161, a rim 162, and an aperture 163 that is defined by rim 162. Body portion 152 of release assembly 150 is configured to be received and reversibly retained by mounting member 170. Body portion 152 is configured to house squib 156, membrane 158, and piston 151 within chamber 157. In the depiction of FIG. 8A, tether release assembly 150 is in a pre-deployment configuration, or a deployment configuration wherein the inflatable airbag will be deployed to the constrained configuration. In the pre-deployment, or retained configuration, post 175 of mounting member 170 protrudes through aperture 163 that is defined by rim 162 on distal region 161 of body portion 152. In the retained configuration, post 175 may rest against piston 151 and may be described as being at least partially within chamber 157. Second region 174 of mounting member 170 comprises a release assembly receiving aperture 176 such that the distal region 161 can be inserted into the second region of the mounting member.

Figure 8B:
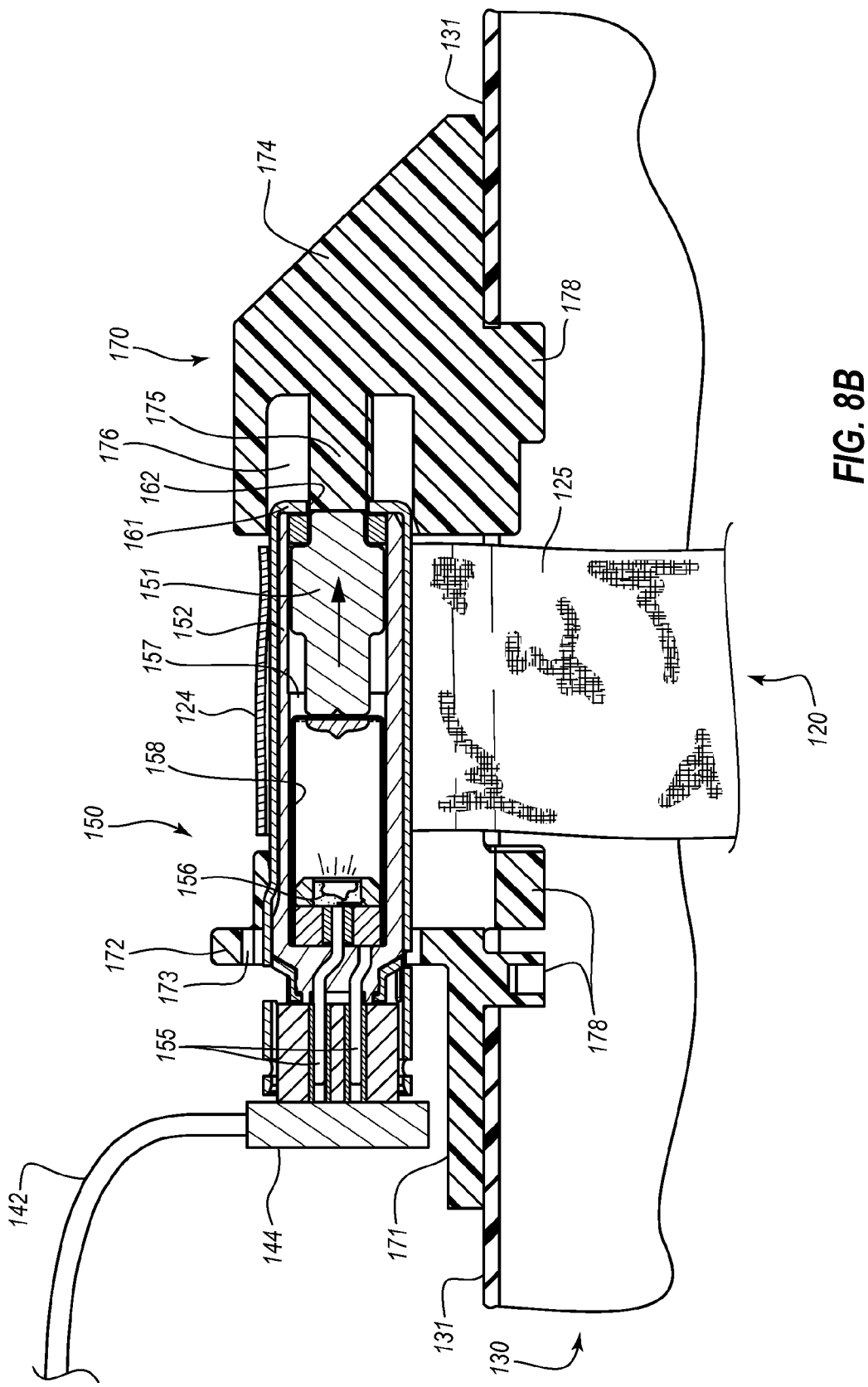
FIG. 8B is a cross-sectional view of the airbag assembly of FIG. 8A at a time that is later in a deployment sequence.

FIG. 8B is a depiction of the components of the airbag assembly of FIG. 8A at a time that is later in a deployment sequence than the view shown in FIG. 8A. In the depiction of FIG. 8B, release assembly 150 has been activated. Pyrotechnic squib 156 may be activated by a signal from one or more vehicle sensors via squib wires 155. Membrane 158 is configured to retain heat, gasses, and particles from squib 156. Upon activation of pyrotechnic squib 156, piston 151 is driven in the direction of post 175, which causes body portion 152 to be driven in an opposite direction, which is away from and out of mounting member 170, thereby releasing tethers 120. Piston 151 may comprise shoulders 154 and a projection 159. Piston 151 may be configured such that only projection 159 of piston 151 can exit distal region 161 of body portion 152. Alternatively, the piston may be configured such that none of it can exit the distal region of the body portion.

Figure 8C:
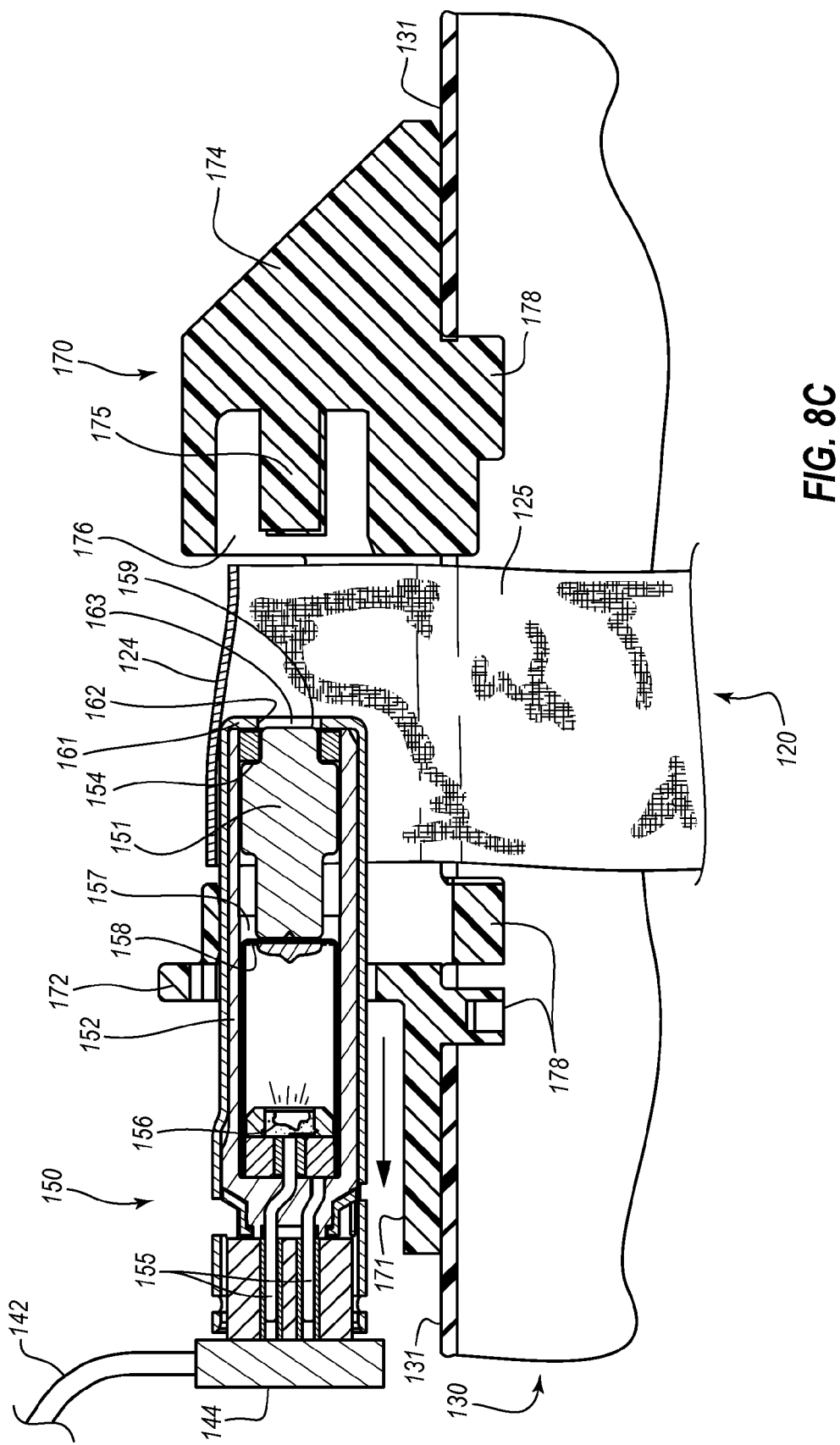
FIG. 8C is a cross-sectional view of the airbag assembly of FIG. 8B at a time that is later in a deployment sequence.
Figure 8D:
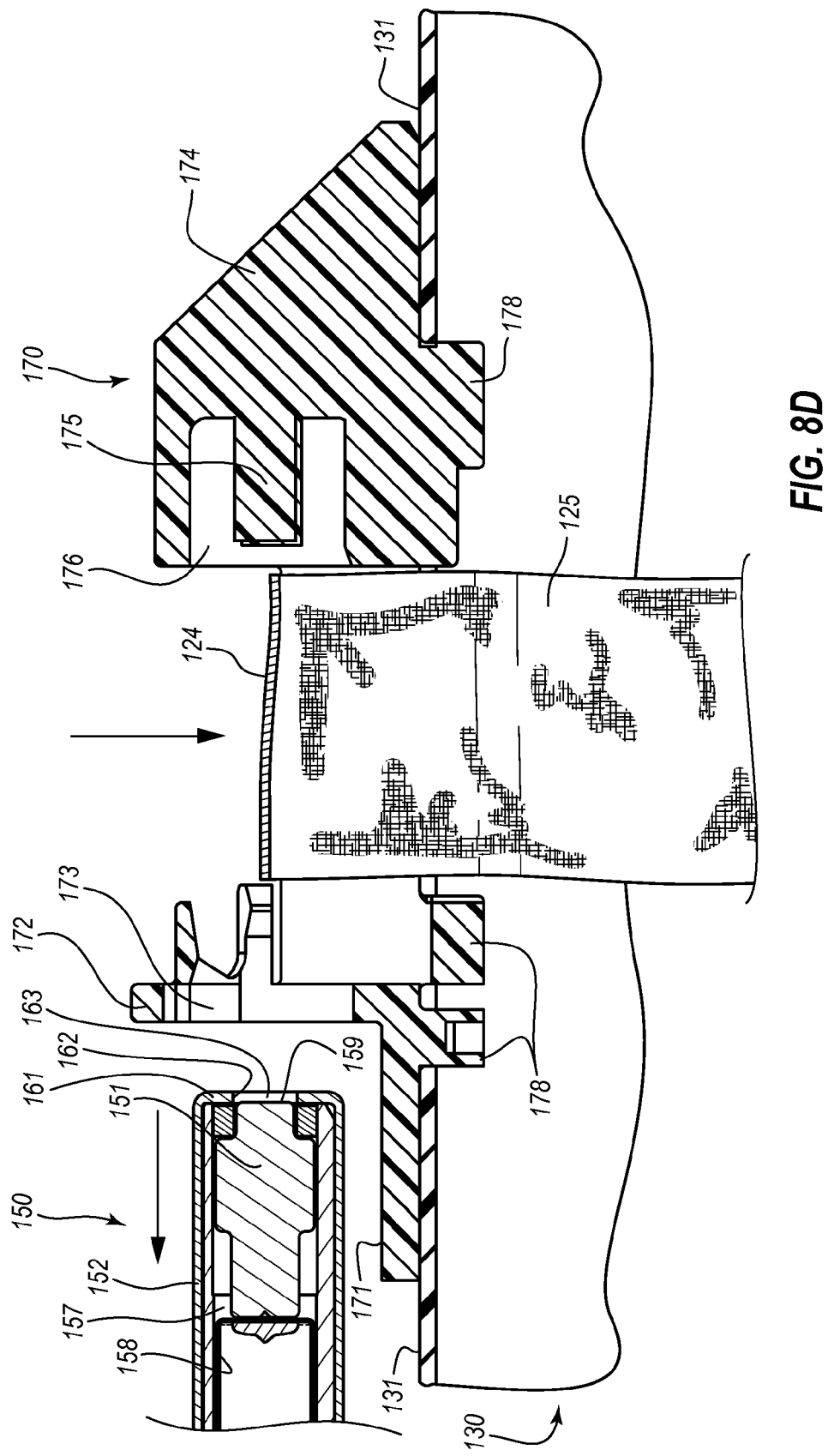
FIG. 8D is a cross-sectional view of the airbag assembly of FIG. 8C at a time that is later in a deployment sequence.

FIGS. 8C-8D are depictions of the components of the airbag assembly of FIG. 8B at a time that is later in a deployment sequence than the view shown in FIG. 8B. In the depiction of FIGS. 8C-8D, body portion 152 of release assembly 150 continues to travel out of mounting member 170, such that tethers 120 are released.

Figure 9:
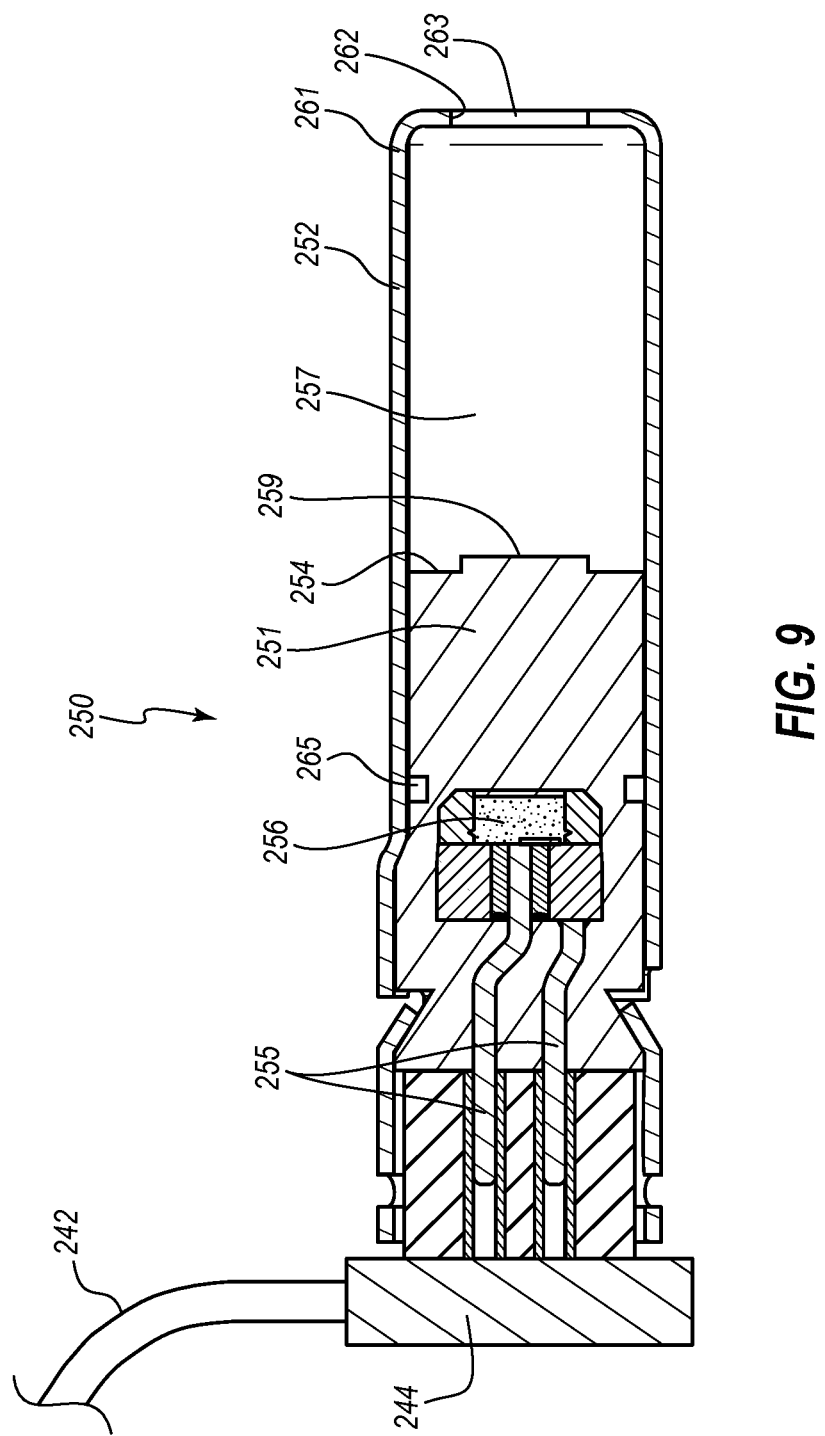
FIG. 9 is a close-up cross-sectional view of a portion of another embodiment of an airbag tether release assembly.
Figure 10A:
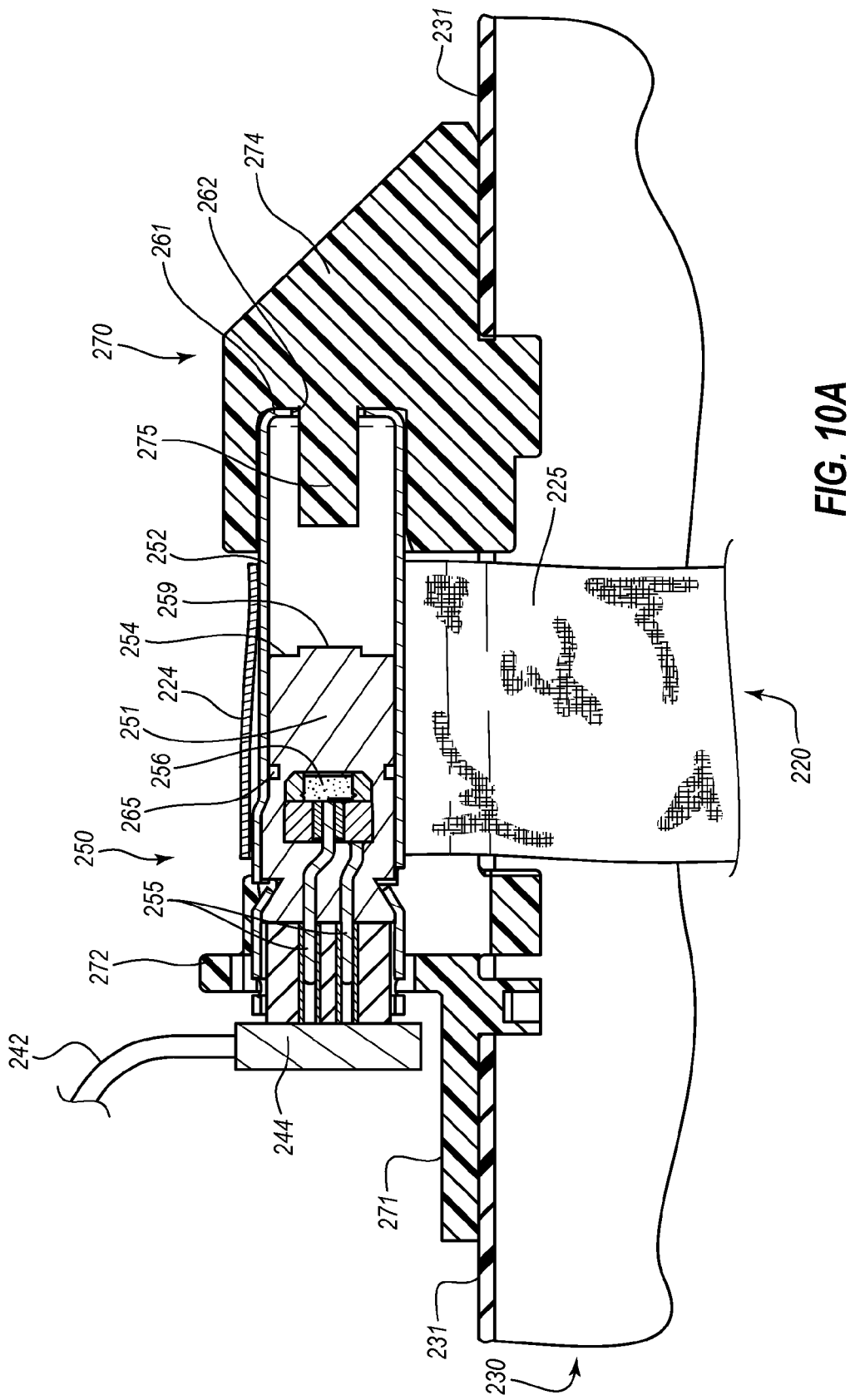
FIG. 10A is a cross-sectional view of a portion of an airbag assembly with a tether release assembly.
Figure 10B:
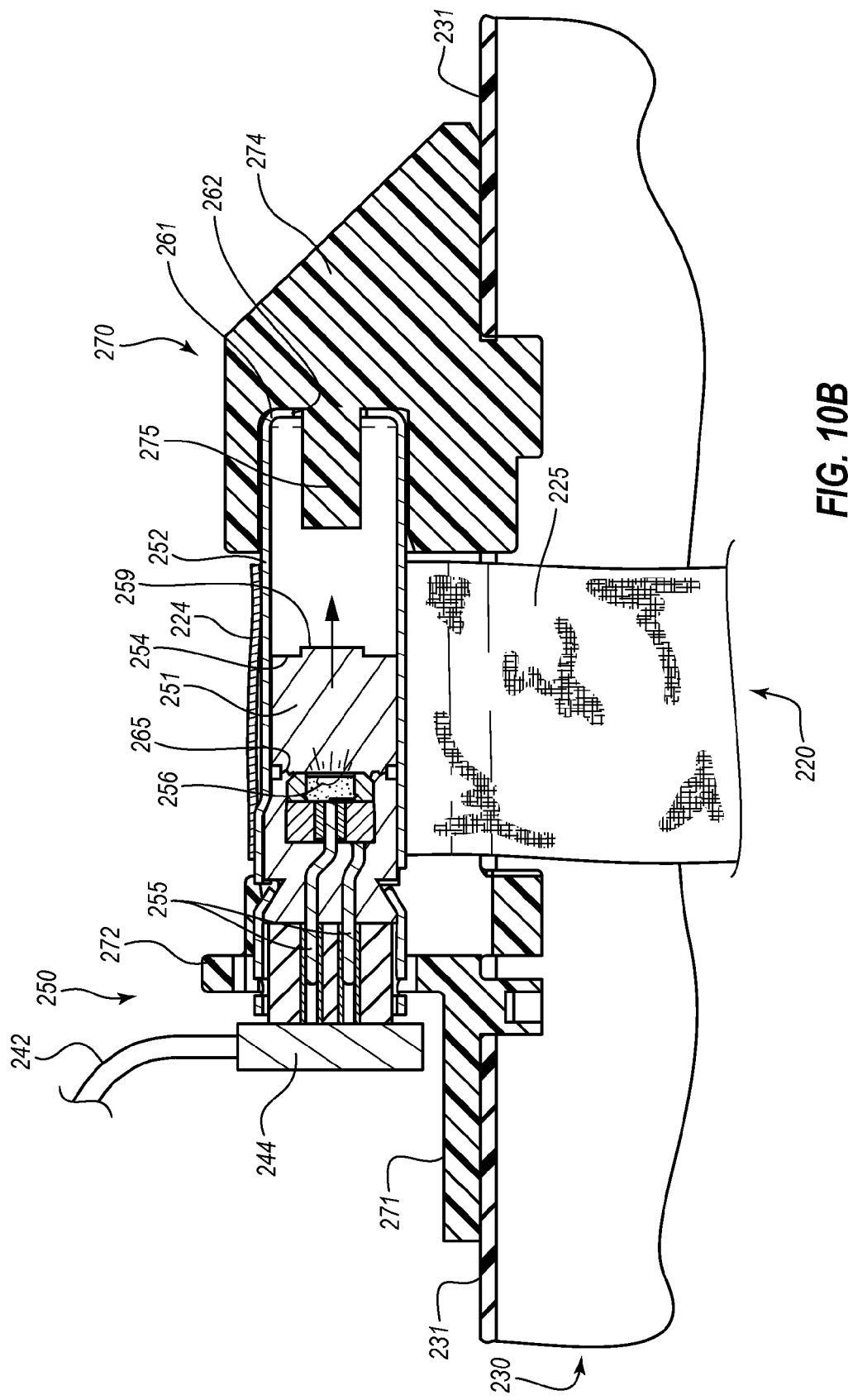
FIG. 10B is a cross-sectional view of the portion of the airbag assembly of FIG. 10A at a time that is later in a deployment sequence.
Figure 10C:
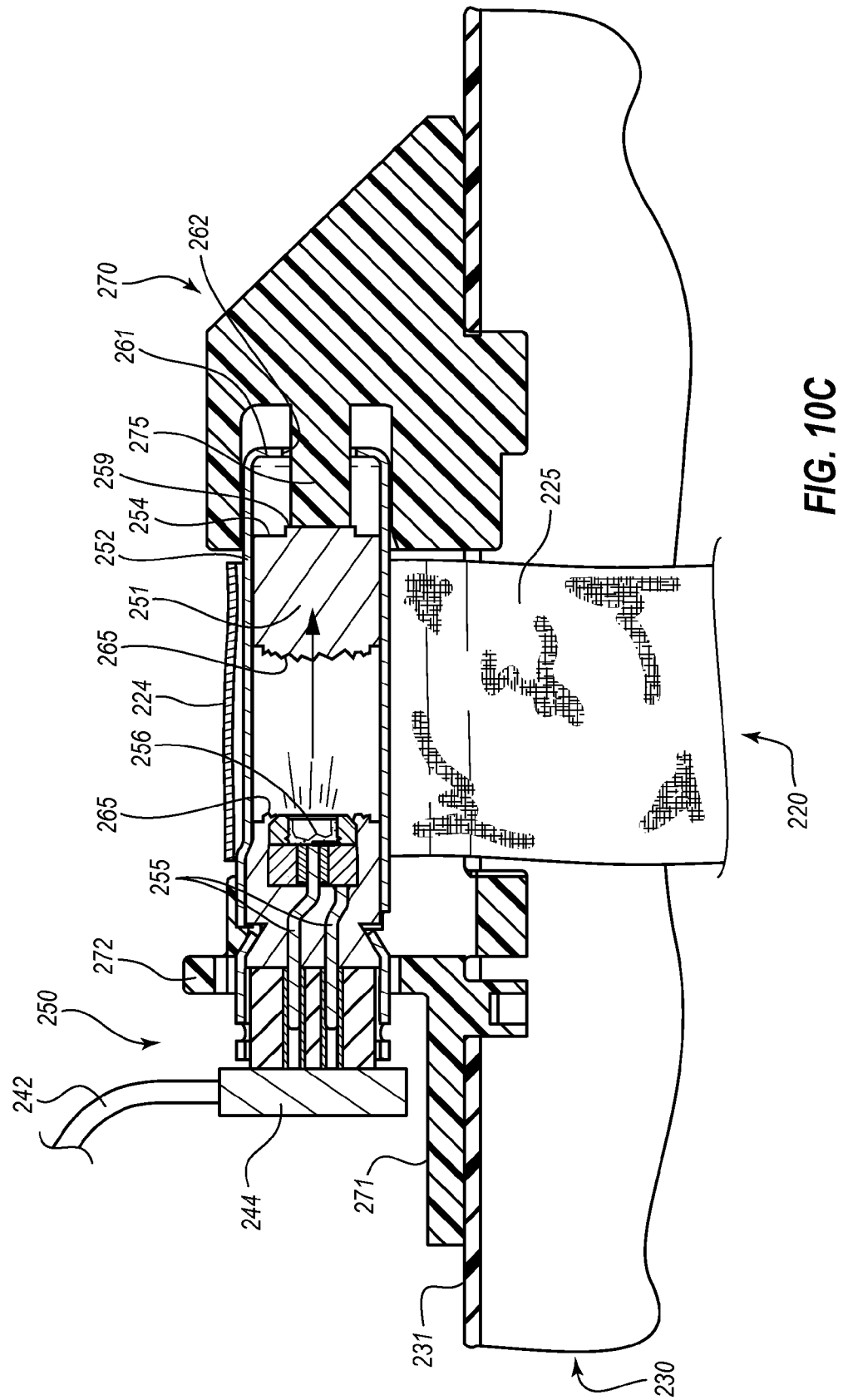
FIG. 10C is a cross-sectional view of the portion of the airbag assembly of FIG. 10B at a time that is later in a deployment sequence.
Figure 10D:
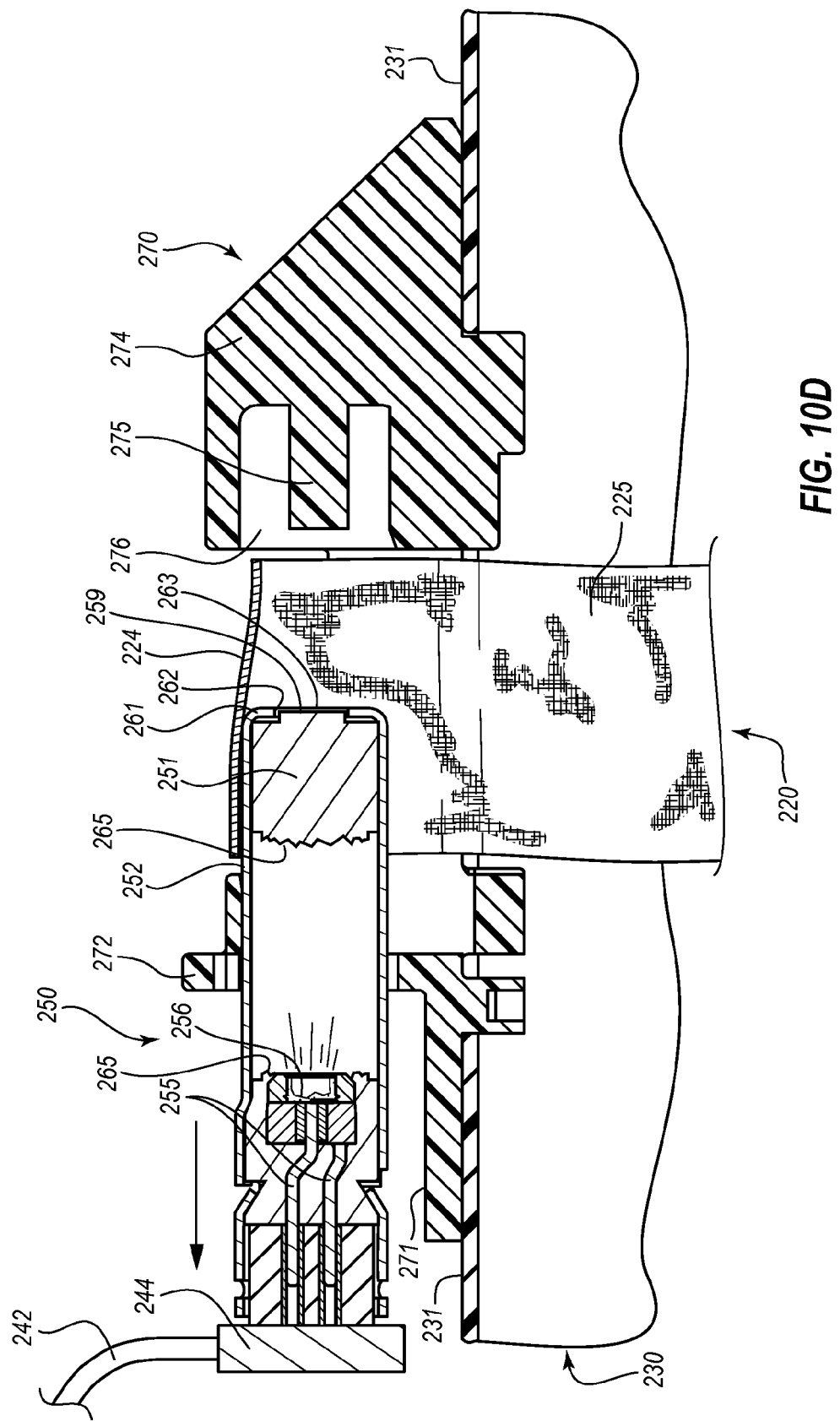
FIG. 10D is a cross-sectional view of the portion of the airbag assembly of FIG. 10C at a time that is later in a deployment sequence.
Figure 10E:
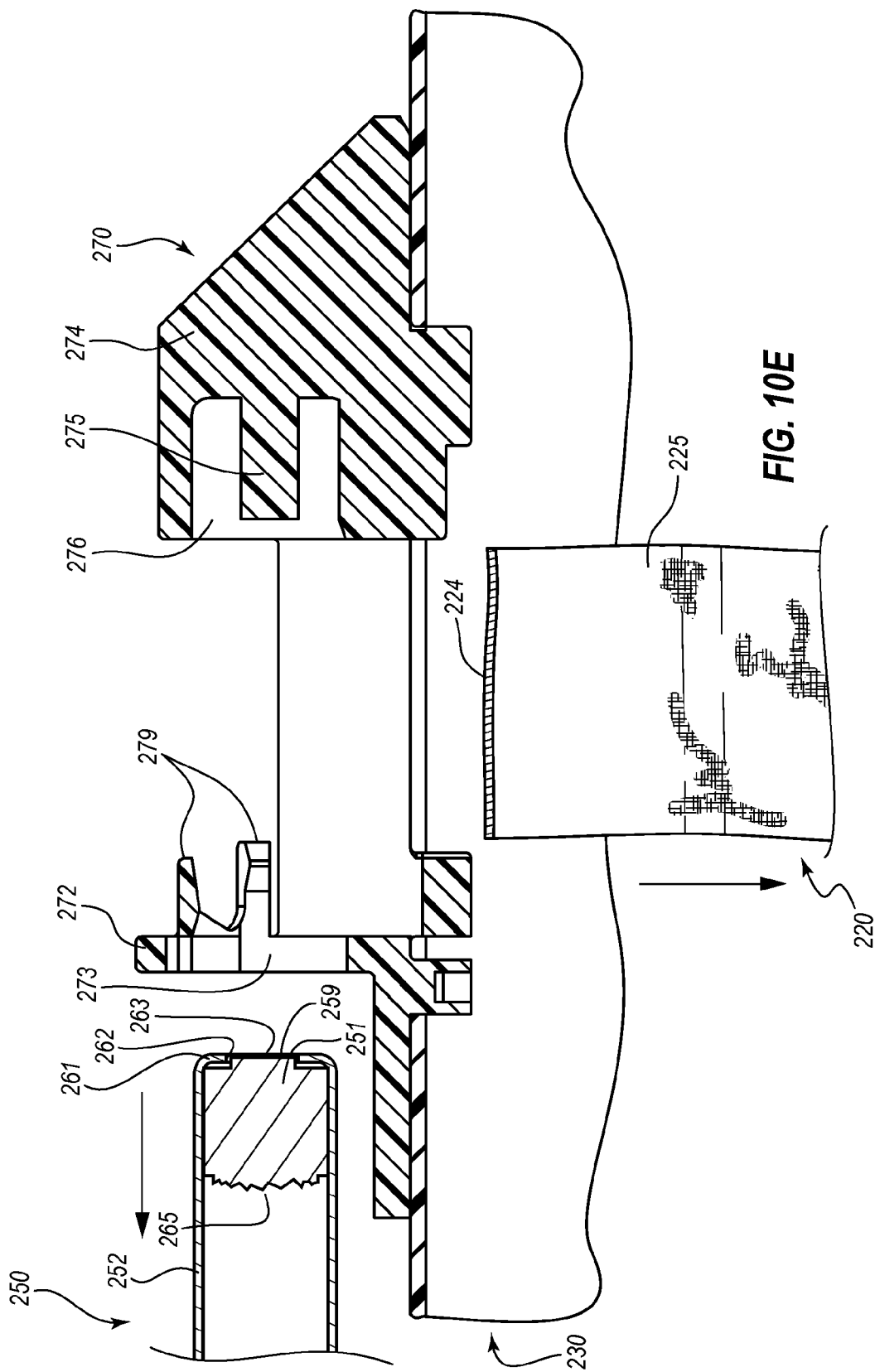
FIG. 10E is a cross-sectional view of the portion of the airbag assembly of FIG. 10D at a time that is later in a deployment sequence.

FIGS. 9-10E depict another embodiment of an airbag assembly 200 with a tether release assembly 250, wherein the airbag assembly and the tether release assembly resemble airbag assembly 100 and tether release assembly 150 described above, in certain respects. Accordingly, like features may be designated with like reference numerals, with the leading hundreds numeral incremented from "1" to "2". Any suitable combination of the features described with respect to airbag assembly 100 and tether release assembly 150 can be employed with assembly 200 and tether release assembly 250, and vice versa.

FIG. 9 is a cross-sectional view of another embodiment of a tether release assembly 250. In some embodiments, release assembly 250 comprises wires 242, activator connector 244, a piston 251, a cylindrical body 252, squib wires 255, a pyrotechnic squib 256, a chamber 257, a distal region 261, a rim 262, an aperture 263 that is defined by rim 262, and a piston rupture point 265. Tether release assembly 250 is configured such that upon activation, pyrotechnic squib 256 causes piston 251 to break at rupture point 265.

FIGS. 10A-10E depict cross-sectional views of portions of another embodiment of an airbag assembly with a tether release assembly. Visible in these figures are portions of airbag tethers 220, airbag housing 230, release assembly 250, and mounting member 270. Tethers 220 comprise connecting portion 225 and loop 224. Housing 230 comprises first longitudinal sidewall 231. In some embodiments, release assembly 250 comprises wires 242, activator connector 244, a piston 251, body 252, squib wires 255, a pyrotechnic squib 256, an internal chamber 257, a distal region 261, a rim 262, and an aperture 263 that is defined by rim 262. Mounting member 270 is configured to receive and reversibly retain body portion 252 of tether release assembly 250, and may comprise base region 271, first region 272, first aperture 273, second region 274, a post 275, and a second aperture 276.

Body portion 252 of release assembly 250 is configured to be received and reversibly retained by mounting member 270. Body portion 252 is configured to house piston 251 and squib 256 within chamber 257. Piston 251 is manufactured or molded as a single assembly with the squib. Piston 251 comprises a base region and a distal region. In the depiction of FIG. 10A, tether release assembly 250 is in a pre-deployment configuration, or a deployment configuration wherein the inflatable airbag will be deployed to the constrained configuration. In the pre-deployment, or retained configuration, post 275 of mounting member 270 protrudes through aperture 263 that is defined by rim 262 on distal region 261 of body portion 252. In the retained configuration, post 275 may be described as being at least partially within chamber 257. Second region 274 of mounting member 270 comprises a release assembly receiving aperture 276 such that the distal region 261 can be inserted into the second region of the mounting member.

FIG. 10B is a depiction of the components of the airbag assembly of FIG. 10A at a time that is later in a deployment sequence than the view shown in FIG. 10A. In the depiction of FIG. 10B, release assembly 250 has been activated. Pyrotechnic squib 256 may be activated by a signal from one or more vehicle sensors via squib wires 255. Upon activation of pyrotechnic squib 256, piston 251 breaks at rupture point 265, thereby separating the base region from the distal region. Distal region of piston 251 is driven in the direction of, and against, post 275, which causes body portion 252 to be driven in an opposite direction, that is, away from and out of mounting member 270, thereby releasing tethers 220. Piston 251 may be configured with a shoulder 254 and a projection 259, such that only a portion of the piston can exit distal region 261 of body portion 252. Alternatively, the piston may be configured such that none of it can exit the distal region of the body portion.

FIGS. 10C-10E are depictions of the components of the airbag assembly of FIG. 10B at times that are later in a deployment sequence. In the sequential depictions of FIGS. 10C-10E, body portion 252 of release assembly 250 continues to travel out of mounting member 270, such that tethers 220 are released.

Piston 251 may be formed from a variety of injection moldable plastics. For example, piston 251 may be formed from nylons, glass-filled nylons, polyetherimides, and glass-filled polyetherimides.

This disclosure incorporates by reference the disclosure of concurrently filed U.S. patent application Ser. No. 13/070,368 titled PYROTECHNIC TETHER RELEASE ASSEMBLY WITH BREAK-AWAY PISTON FOR INFLATABLE AIRBAGS filed on Mar. 23, 2011 and German Patent Application No. DE102011014869.8 titled ATTACHMENT DEVICE FOR RELEASABLE ATTACHMENT OF A MEMBER TO A VEHICLE AIRBAG filed on Mar. 23, 2011 on behalf of Marcus Weber.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
an inflatable airbag;
an inflatable airbag housing coupled to the inflatable airbag;
a tether release assembly mounting member attached to the airbag housing;
a tether release assembly that is reversibly coupled to the tether release mounting member;
wherein the tether release assembly comprises an interior chamber, an expandable membrane, a pyrotechnic squib, and a piston,
wherein the membrane is located within the interior chamber and between the pyrotechnic squib and the piston, and
wherein the expandable membrane receives heat and gas from the pyrotechnic squib, upon activation of the pyrotechnic squib, to act on the piston such that the piston acts on the mounting member to uncouple the tether release assembly from the mounting member; and,
a tether reversibly coupled to the tether release assembly;
wherein upon receipt of a signal from a vehicle sensor, the tether release assembly becomes uncoupled from the mounting member and the tether becomes uncoupled from the tether release assembly to release the tether.

2. The inflatable airbag assembly of claim 1, wherein the mounting member is coupled on an external side of the housing.

3. The inflatable airbag assembly of claim 1, wherein the tether is reversibly attached to the body portion of the tether release assembly.

4. The inflatable airbag assembly of claim 1, wherein the tether release assembly slides out of the mounting member and becomes completely uncoupled from the mounting member.

5. The inflatable airbag assembly of claim 1, wherein the tether release assembly comprises an electric wire, and wherein the electric wire acts as a stop for the tether release assembly.

6. An inflatable airbag assembly, comprising:
an inflatable airbag;

an inflatable airbag housing coupled to the inflatable airbag;

a tether release assembly mounting member attached to the airbag housing, wherein the tether release assembly comprises an open end and a closed end, and wherein a post is located within the mounting member at the closed end;

a tether release assembly that is reversibly coupled to the tether release mounting member;

wherein the tether release assembly comprises an interior chamber, and wherein a pyrotechnic squib and a piston are located within the interior chamber, wherein, upon activiation, the pyrotechnic squib generates heat and gas, which act on the piston to push the piston against the post within the mounting member, such that the tether release assembly slides away from the closed end of the mounting member, thereby allowing the tether release assembly to become uncoupled from the mounting member; and;

a tether reversibly coupled to the tether release assembly;

wherein upon receipt of a signal from a vehicle sensor, the tether release assembly becomes uncoupled from the mounting member and the tether becomes uncoupled from the tether release assembly to release the tether.

7. The inflatable airbag assembly of claim 6, wherein the tether release assembly comprises a distal aperture located at a distal end, which is opposite the pyrotechnic squib.

8. The inflatable airbag assembly of claim 7, wherein in the coupled configuration, the post of the mounting member projects through the distal aperture in the release assembly into the internal chamber of the tether release assembly.

9. The inflatable airbag assembly of claim 8, wherein the piston is located between the pyrotechnic squib and the post of the mounting member.

10. The inflatable airbag assembly of claim 6, wherein the mounting member is configured to retain the release assembly from sliding out of the mounting member before the pyrotechnic squib is activated.

11. The inflatable airbag assembly of claim 6, wherein the tether release assembly comprises an expandable membrane that is located within the interior chamber and receives the heat and gas from the pyrotechnic squib.

12. The inflatable airbag assembly of claim 11, wherein the membrane is located between the pyrotechnic squib and the piston.

13. The inflatable airbag assembly of claim 6, wherein the piston comprises a shoulder and a projection.

14. The inflatable airbag assembly of claim 13, wherein the distal end of the tether release assembly comprises an inward facing rim, which defines the aperture in the distal end and which is configured to engage the shoulder of the piston, when the piston travels to the distal end of the release assembly, such that the rim acts as a stop for the piston.

15. The inflatable airbag assembly of claim 14, wherein after the piston has traveled to the distal end of the release assembly, the projection extends through the aperture in the distal end of the release assembly.

16. An inflatable airbag assembly, comprising:

an inflatable airbag;

an inflatable airbag housing coupled to the inflatable airbag;

a tether release assembly mounting member attached to the airbag housing, wherein the tether release assembly comprises an open end and a closed end, and wherein a post is located within the mounting member at the closed end;

a tether release assembly that is reversibly coupled to the tether release mounting member; wherein the tether release assembly comprises a body portion with an interior chamber, and wherein a pyrotechnic squib and a piston are located within the chamber;

wherein the piston comprises a base region and a distal region, and wherein the pyrotechnic squib is located within the base region of the piston, and wherein, upon activation, the pyrotechnic squib generates heat and gas, which act on the piston to push the piston against the post within the mounting member, such that the tether release assembly slides away from the closed end of the mounting member, thereby allowing the tether release assembly to become uncoupled from the mounting member; and;

a tether reversibly coupled to the tether release assembly;

wherein upon receipt of a signal from a vehicle sensor, the tether release assembly becomes uncoupled from the mounting member and the tether becomes uncoupled from the tether release assembly.

17. The inflatable airbag assembly of claim 16, wherein the piston comprises a shoulder and a projection.

18. The inflatable airbag assembly of claim 17, wherein the distal end of the tether release assembly comprises an inward facing rim, which defines the aperture in the distal end and which is configured to engage the shoulder of the piston, when the distal end of the piston travels to the distal end of the release assembly, such that the rim acts as a stop for the distal end of the piston.

19. The inflatable airbag assembly of claim 18, wherein after the distal end of the piston has traveled to the distal end of the body of the release assembly, the projection on the distal end of the piston extends through the aperture in the distal end of the body of the release assembly.

* * * * *